(12) United States Patent
Startchik et al.

(10) Patent No.: US 12,462,596 B2
(45) Date of Patent: Nov. 4, 2025

(54) COMPUTER IMPLEMENTED METHOD AND SYSTEM OF SKIN IDENTIFICATION COMPRISING SCALES

(71) Applicant: U-NICA SYSTEMS AG, Landquart (CH)

(72) Inventors: Sergei Startchik, Geneva (CH); Serge Heughebaert, Zurich (CH)

(73) Assignee: U-NICA SYSTEMS AG, Landquart (CH)

( * ) Notice: Subject to any disclaimer, the term of this patent is extended or adjusted under 35 U.S.C. 154(b) by 512 days.

(21) Appl. No.: 17/796,530

(22) PCT Filed: Feb. 1, 2021

(86) PCT No.: PCT/EP2021/052337
§ 371 (c)(1),
(2) Date: Jul. 29, 2022

(87) PCT Pub. No.: WO2021/152182
PCT Pub. Date: Aug. 5, 2021

(65) Prior Publication Data
US 2023/0351722 A1 Nov. 2, 2023

(30) Foreign Application Priority Data

Jan. 31, 2020 (EP) .................................. 20155042

(51) Int. Cl.
*G06V 10/44* (2022.01)
*G06V 10/426* (2022.01)
(Continued)

(52) U.S. Cl.
CPC ............ *G06V 40/10* (2022.01); *G06V 10/426* (2022.01); *G06V 10/457* (2022.01); *G06V 10/48* (2022.01)

(58) Field of Classification Search
CPC .... G06V 40/10; G06V 10/426; G06V 10/457; G06V 10/48
See application file for complete search history.

(56) References Cited

U.S. PATENT DOCUMENTS

| | | |
|---|---|---|
| 7,684,088 B2 | 3/2010 | Jordan et al. |
| 10,019,627 B2 | 7/2018 | Kutter et al. |

(Continued)

FOREIGN PATENT DOCUMENTS

| | | |
|---|---|---|
| CA | 2825681 A1 | 2/2015 |
| CN | 106682912 A | 5/2017 |

(Continued)

OTHER PUBLICATIONS

Tomita, Fumiaki, Yoshiaki Shirai, and Saburo Tsuji. "Description of textures by a structural analysis." IEEE transactions on pattern analysis and machine intelligence 2 (1982): 183-191. (Year: 1982).*

(Continued)

*Primary Examiner* — Siamak Harandi
*Assistant Examiner* — Denise G Alfonso
(74) *Attorney, Agent, or Firm* — The Webb Law Firm

(57) ABSTRACT

A computer implemented method of skin identification having scales, especially reptile skin identification, includes the steps of acquiring at least one image of a skin portion to be identified, detecting of features corresponding to borders of scales in the image, building a graph of the repetitive pattern scales positions of detected scales, determining the outline of the detected scales and representing the detected scales based on their outline, and determining recognition features data of detected scales for traceable identification of the skin comprising scales. The detection of scales is based on scan lines.

6 Claims, 23 Drawing Sheets

(51) Int. Cl.
*G06V 10/48* (2022.01)
*G06V 40/10* (2022.01)

(56) References Cited

U.S. PATENT DOCUMENTS

| | | |
|---|---|---|
| 2007/0211921 A1 | 9/2007 | Popp et al. |
| 2013/0277425 A1 | 10/2013 | Sharma et al. |
| 2014/0140570 A1 | 5/2014 | Ross et al. |
| 2015/0371087 A1 | 12/2015 | Ross et al. |
| 2017/0243284 A1 | 8/2017 | Rubman et al. |
| 2018/0153234 A1 | 6/2018 | Nam |
| 2021/0089763 A1* | 3/2021 | Shamsi ................ G06V 10/54 |

FOREIGN PATENT DOCUMENTS

| | | |
|---|---|---|
| CN | 107525873 A | 12/2017 |
| CN | 108645797 A | 10/2018 |
| EP | 1438607 B1 | 7/2004 |
| EP | 1751695 B1 | 2/2007 |
| EP | 2257909 B1 | 12/2010 |
| EP | 2614486 B1 | 7/2013 |
| JP | 2015228570 A | 12/2015 |
| KR | 1020180061819 A | 6/2018 |
| WO | 03038132 A1 | 5/2003 |
| WO | 2013084242 A2 | 6/2013 |
| WO | 2015179686 A1 | 11/2015 |
| WO | 2018129051 A1 | 7/2018 |
| WO | 2018189002 A1 | 10/2018 |

OTHER PUBLICATIONS

Moreno, Rodrigo, et al. "Robust color edge detection through tensor voting." 2009 16th IEEE International Conference on Image Processing (ICIP). IEEE, 2009. (Year: 2009).*

Fumiaki, Tomita et al., "Description of Textures by a Structural Analysis", IEEE Transactions on Pattern Analysis and Machine Intelligence, Mar. 1982, pp. 183-191, vol. 30, No. 2.

Schaffalitzky, F. et al., "Geometric grouping of repeated elements within images", BMVC 98. Proceedings of the Ninth British Machine Vision Conference Univ. Southampton Southampton, UK, Jan. 1, 1998, pp. 2.1-2.10, https://www.robots.ox.ac.uk/~vgg/publications/1998/Schaffalitzky98/schaffalitzky98.pdf.

Yip, Raymond K.K. et al., "Modification of Hough Transform for Circles and Ellipses Detection Using a 2-Dimensional Array", Pattern Recognition, 1992, pp. 1007-1022, vol. 25, No. 9.

* cited by examiner

FIG. 13A
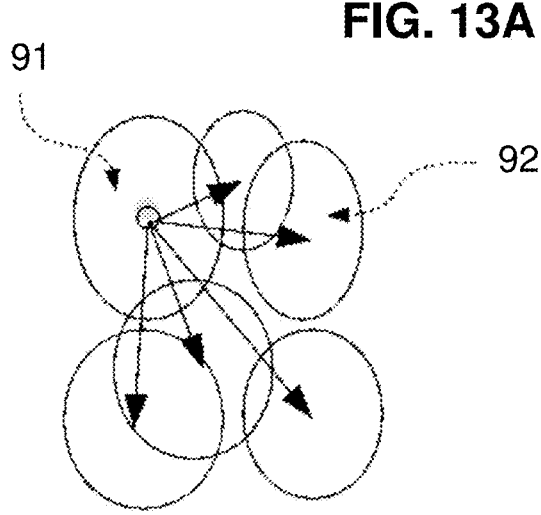
FIG. 13B
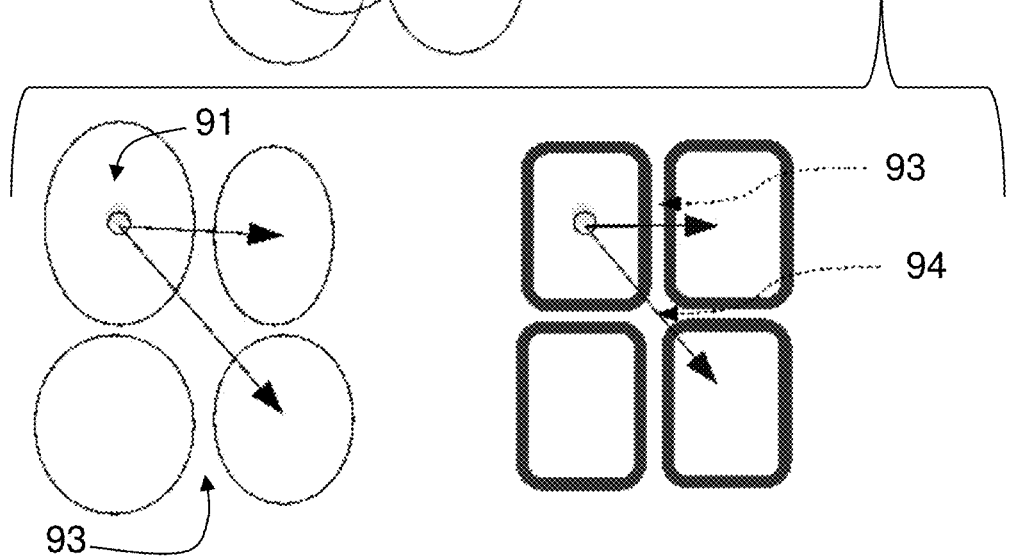
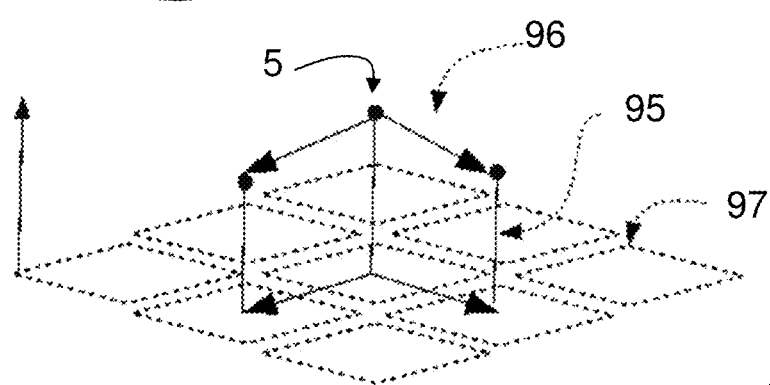
FIG. 13C
FIG. 13D
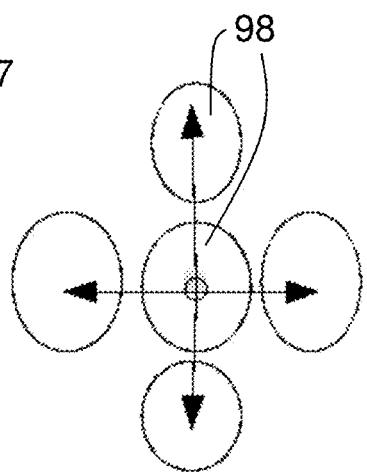

COMPUTER IMPLEMENTED METHOD AND SYSTEM OF SKIN IDENTIFICATION COMPRISING SCALES

CROSS-REFERENCE TO RELATED APPLICATIONS

This application is the United States national phase of International Application No. PCT/EP2021/052337 filed Feb. 1, 2021, and claims priority to European Patent Application No. 20155042.3 filed Jan. 31, 2020, the disclosures of which are hereby incorporated by reference in their entirety.

BACKGROUND OF THE INVENTION

Field of the Invention

The present invention relates to a computer implemented method and system of skin identification comprising scales, especially reptile skin identification, from pictures taken by smartphone camera or scanner in various ambient conditions.

This invention relates to the authentication and identification of animal hides, in particular of shingled hides, with the possibility of tracing via global trade channels. The Track & Trace process encompasses the complete lifecycle of animal skins, with all relevant data available in real time and worldwide.

Description of Related Art

The protection of documents and objects against all forms of counterfeiting crime is a widespread and increasing need of manufacturers of original products, state publishers of identity documents and other organizations. Closely related to identity is the concept of authenticity. In the case of documentation, the authenticity stands for the genuineness of the associated documents. For areas of application that deal centrally with the tracing of objects and living things, identity and authenticity are closely interlinked. Essentially, tracing of objects (track & trace) in the narrower sense of the word revolves around the identity of these objects, the uniqueness of which is determined by a non-cloneable bundle of special properties. The tasks, which have the traceability of individual objects to the topic, have as common basis the genuineness—thus the authenticity—of accompanying documents of physical and digital nature. The subject of this invention is a track & trace method of reptile skins from the birth of the animals to a final product made from their skins. Identity and authenticity are considered equivalent in the sense of this invention and, due to their interdependence, are mutually replaced or mentioned in combination. In a broader sense, the term track & trace includes the traceability of objects that are identical in construction, but not individually identical. This is the case, for example, in a successfully performed method which makes it possible to track the series of the product via the trade channels by means of a deterministic change of a product-identifying vector graphic as disclosed in EP 2 614 486 B1. Methods that make the identity of an individual object on item level accessible and measurable are referred to as fingerprint methods. For this purpose, on the one hand, natural random microstructures as in EP 2 257 909 B1 or artificially introduced (pseudo-random) microstructures are endeavored as shown in U.S. Pat. No. 7,684,088 B2.

In terms of the track & trace of living things, random characteristics of living entities are somehow formalized. This process is called biometrics, whereby random properties, in particular visually or acoustically accessible properties, are transformed into a technically detectable structure, quasi template as a base for recognition. This inevitably involves the reduction of the complex combination of random properties to more simple structure elements in order to make biometrics technically manageable. For example, facial recognition evaluates the visual metric of a face over the eye distance, nose-to-upper lip distance, etc. Other biometric techniques rely on the fingerprint, the shape of the retina or a voice signature. Depending on the application, the biometrics must be adapted. To verify the identity of reptiles, for example, a face recognition is rather unsuitable. In addition, the biometric application must consider the life cycle of a living being. A successful facial recognition is in fact not possible, if so the identity over a life cycle from the baby to old age should be checked. Even methods based on DNA determination are of little help if a life cycle from the "egg to the purse" of a reptile or a reptile skin or a product manufactured thereof is to be covered. Finally, in a biometric track & trace method the allowed error rate must be clarified, e. g. how many individuals must be distinguishable with what reliability. Reliability comes with performance criteria such as the false acceptance rate (FAR) or the rate of false rejection (FRR). In the case of a human being in case of doubt, different biometric test results are compared with each other. Thus, fingerprints might be sufficient in the first test, but need to be completed by a more complex evaluation of DNA for confirmation in case of doubt. This redundant biometric exam allows a very low probability of identity verification errors. If there is only one biometric method available, which is to say a certain biometric set of parameters, then the biometric requirements for FAR and FRR must be very high. A method that the traceability of an individual reptile or its skin or a product thereof must have very special recognition parameters appropriate species and at the same time be extremely powerful in terms of their reliability.

EP 1 751 695 B1 proposes to increase the reliability by multiple scans and the deviations between them via the path of a stored two-dimensional variation code. The usual and necessary data acquisition devices with ubiquitous availability, i.e. smartphones, ideally should have just one recording to capture the biometric parameters, especially since the images are taken by hand and several images themselves already contain a variability. It is to be expected that multiple scans or images according to the proposed offer no advantages.

CA 2 825 681 C goes in the same direction with the comparison of several feature vectors (FV). It is quite similar with the methods for object recognition described in US 2014/0140570 and US 2015/0371087.

KR20180061819A reclaims a device for the evaluation of several biometric signals from the same object. The device itself can be mobile and connected to a server and thus meets a standard demanded by the market.

US 2007/211921 A1 describes a method for connecting biometric signals to physical characteristics of the object. These are in turn stored as a profile on a database. The method is geared to interactive inputs of a user, so that—for example—the biometric data of one of his hands are enough to order clothes of the appropriate size. A use of the fingerprint data stored in this way about tracing the history of the user over a large period of his lifetime, if not its entire life cycle, is thus not possible and not intended by the inventors.

WO 2018/129051 A1 is related to the fabric or the tissue of a garment, wherein the garment thus is assigned to an identification code (UID). One limitation is that the relevant pattern must be spread across at least 10% of the surface of the selected article. The invention discloses a type of bar code in the form of a pattern in the substance to be detected. The whole thing is an interesting smartphone application, but for Track & Trace not or only conditionally applicable and, if used, only on immutable items can be used.

In contrast, the system shown in WO 03/038132 A1 applies to the tracking of animal skins. In this case, hole patterns and detection of the same with optical sensors are the core of the invention. The proposed technology is an unsuitable solution for the current problem. Only the physical impairment of the animal skins and their products through hole patterns is not acceptable.

For the same reasons, the solutions according to WO 2018/189002 A1, applied to decorated leather in particular, as well as WO 2015/179686 A1, applied to the life cycle of animals in general, are not acceptable since the tattooing methods described therein are both an impairment of the animal products and protect against falsifications in a very limited way.

The inventions according to CN 108645797 A, CN 107525873 A and US 2017/243284 A1 see the DNA analysis as a reliable tool for track & trace of animal skins from the living animal to processed gelatin, meat, leather or fur product. Though, DNA analysis is no adequate solution for fast and simple reptile skin tracking throughout the whole value and supply chain.

The authors of WO 2013/084242 A2, EP 1 438 607 A1 or US 2018/153234 A1, favor the deployment of radio transponders or transponder cards. The first two patent documents relate to the tracking of livestock herds on the supply chain, while US 2018/153234 A1 discloses the labeling of animal skins and leather products with RFID chips for protection against loss or protection against counterfeiting. Also, in this case, the cost of tracing over the entire lifetime and product chain is not insignificant and the method is feasible only with special equipment for verification. Such devices are not ubiquitously available, and, thus, represent an undesirable barrier.

The peculiarities of an individually designed surface can, in principle, be used for the track & trace of animal skins over the entire value chain up to the processed, commercially available product. Such peculiarities should not only be characteristic of an individual product, but also possess a non-copiable or non-cloneable shape (Physical Unclonable Function, PUF) to ensure protection against counterfeiting. As a rule, such non-cloneable surface elements are realized by complex random microstructures (Physical Random Function, PRF). The terms PUF and PRF are therefore used below as synonyms. The use of such structures as a fingerprint for an object is discussed, for example, in CN106682912A or U.S. Pat. No. 10,019,627 B2 and JP 2015/228570 A, whereby, the first two patent documents particularly considering the three-dimensional structure and the latter the communication of a UID (Unique Information Function) connected to the randomness structure via portable Devices. A practicable embodiment with respect to track & trace of animal products from the birth of the animal to the finished animal product is not discussed in any way.

One approach to tracking an item across the entire value chain is US 2013/277425 A1. The motivation for the underlying invention lies in the prevention of theft, counterfeiting and unauthorized use of an object. For authentication, an "interrogation device" is proposed, which carries out its task at various points along the value chain by querying a label. The method is hardly suitable for living objects, thus offering no solution to the problem of the present invention.

Fumiaki Tomita et al. have published in March 1982 the article "Description of Textures by a Structural Analysis" in IEEE Transactions on pattern analysis and machine intelligence, IEEE Computer Society, USA, vol. 30, no. 2, pages 183-191, XP 011242555, ISSN: 0162-8828 a computer implemented method of surface identification comprising scales and applied this method especially to reptile skin identification.

SUMMARY OF THE INVENTION

Based on the above mentioned prior art, it is an object of the present invention to provide an improved computer implemented method of surface identification comprising scales, especially for reptile skin identification, including creating a database for later comparison of the acquired data. It is a further object of the invention to provide a method for tracking and tracing animal skins, especially reptile skins, over the entire life cycle and subsequent processing steps of tanning, dyeing and manufacturing of the final products such as handbags, shoes and so forth, based on such a created database.

Further possible advantages of embodiments of the invention should comply with additional criteria such as verification with a ubiquitous device, a smartphone, tablet, etc., protection against manipulation, counterfeiting and trafficking of endangered species or trafficking via illegal distribution channels, as well as high efficiency have priority.

Finally, the method according to the invention may not be invasive or destructive of material and must at the same time be highly reliable and robust. Due to the highly public sensitive wild life trade worth billions the trade is highly regulated to better manage and control survival of wild life. The present invention shall allow a highly efficient and economical regulatory management.

The current invention provides a method that captures appearance of reptile skin from camera-based devices and allows to uniquely identify a skin or part of the skin. The first mentioned object is achieved with a computer implemented method of surface identification comprising scales, especially reptile skin identification, comprising the steps of acquiring at least one image of a surface portion to be identified, detecting features in an edge feature detection step corresponding to borders of scales in said image by scanning the acquired image along scan lines over an area supposedly comprising a plurality of scales acquiring intensity or color profiles, an edge identification step based on the acquired scan line image profiles determining scale edge candidates of one or more scales, a scale construction voting step based on said scale edge candidates determining adequate scale edges being part of a specific scale, a scale vote accumulation step determining a data set representative for the identified scale, comprising optionally one or more data taken from the group comprising data relating to an ellipse, the major axis and minor axis of the ellipse, center position of the ellipse, building a graph of the repetitive pattern scales positions of detected scales using the data sets for each of the identified scales, introducing a recomputing scales step identifying further scales where the built graph of scales presents gaps. determining the outline of the detected scales and creating a representative data set for each of the detected scales comprising said outline data, determining recognition features data of detected scales from the plurality of representative data sets of the surface comprising scales, and storing said recognition features data for said surface comprising scales in a database.

The scale construction voting step can preferrably be followed by a scale verification step comprising checking the acquired data related to the identified scale against predetermined scale outline properties.

The step of building a graph of the repetitive pattern scales positions of detected scales can further comprises determining from the group of identified scales candidates adjacent non overlapping scales.

The above mentioned method forms the basis for a method of tracking and tracing animal skins, especially reptile skins, comprising the steps of executing the above method for an animal skin specimen comprising said surface comprising scales to acquire recognition features data, followed by the step of: comparing said acquired recognition features data of said animal skin specimen with previously acquired and stored sets of recognition features data of surfaces comprising scales from reptile skins for an identification of the surface portion of the animal skin specimen within said stored recognition features data, and, in the case of a match of the acquired recognition features data of the animal skin specimen with a stored set of recognition features, updating said database with the comparison result and the updated acquired recognition features.

Then it is preferred that the step of comparing the acquired recognition features is followed by the step of updating said database with the comparison result and the updated acquired recognition features, so that authenticity of the surface can be checked over time.

The step of detecting of features corresponding to borders of scales in said image can comprise an edge feature detection step by scanning the acquired image along scan lines over an area supposedly comprising a plurality of scales acquiring intensity or color profiles, an edge identification step based on the acquired scan line image profiles determining scale edge candidates of one or more scales, a scale construction voting step based on said scale edge candidates determining adequate scale edges being part of a specific scale, and a scale vote accumulation step determining a data set representative for he identified scale, comprising optionally one or more data taken from the group comprising data relating to an ellipse, the major axis and minor axis of the ellipse, center position of the ellipse.

When the same surface is scanned at a different time, the acquired recognition features are preferredly stored as updated recognition features when the surface was recognized, so that the evolution over time of the surface can be followed and small changes of the surface property can be updated.

When the same surface is scanned at such a different time, further surface parts of the same surface can be scanned for acquiring recognition features of said further surface parts and are stored as updated surface part recognition features as separate datasets when said same surface was recognized. This is especially helpful, when the surface is separated later on in different smaller surface parts for handling, working and selling these parts separately.

The method is preferredly executed in a computer system comprising a processor, a computer storage comprising the computer program product adapted to execute the above mentioned method steps, further comprising a camera adapted to acquire an image of the surface to be identified and further computer memory for storing acquired recognition features in a database.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

FIG. 13A to 13D show method steps relating to adjacency and neighborhood evaluation;

DESCRIPTION OF THE INVENTION

Figure 1:
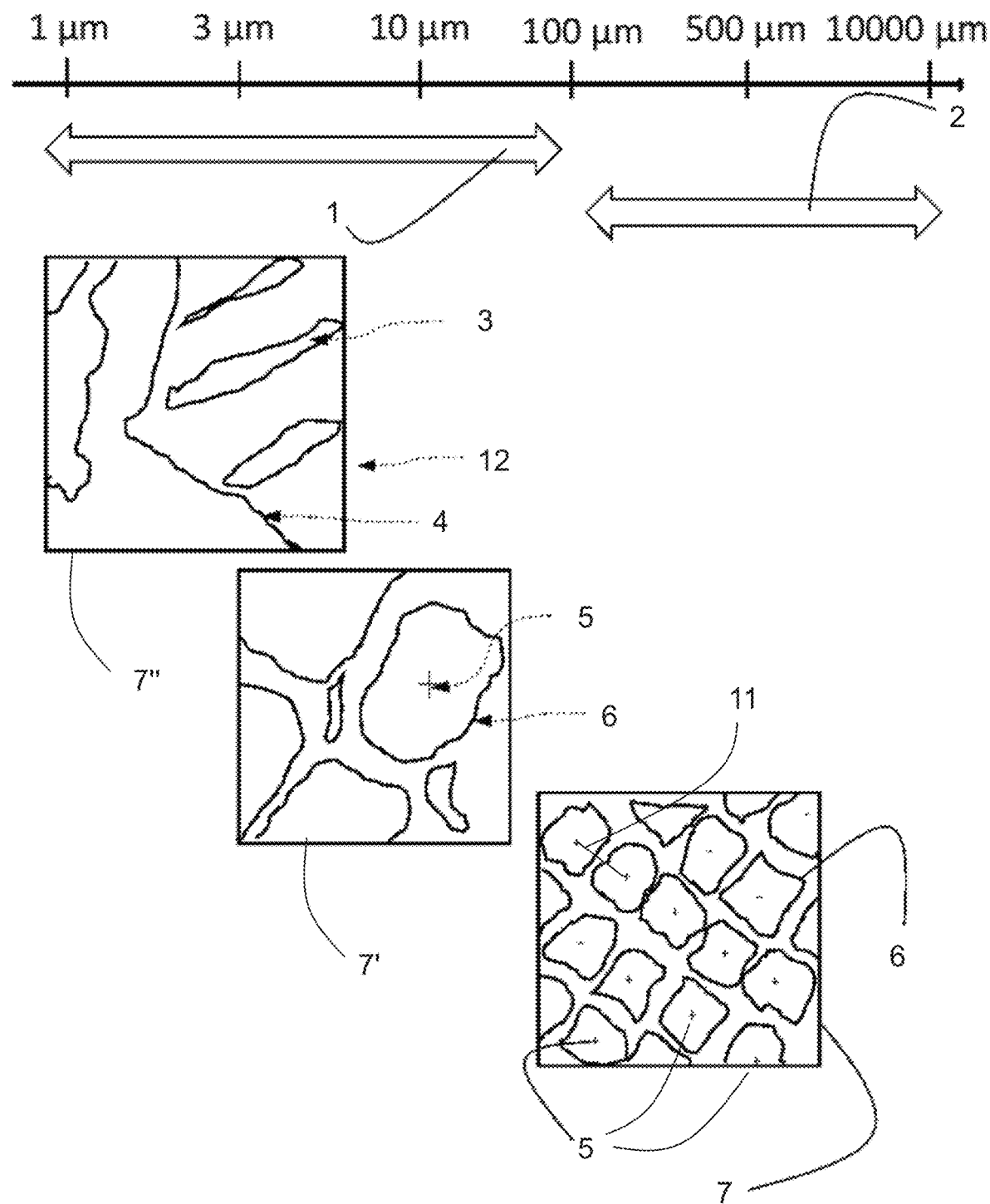
FIG. 1 shows visible details on a reptile skin in three detail views in the range form 1 μm to 1000 μm.

The designed solution comprises use of a preferably portable computer with a processor, memory and camera in connection with a wider, preferably remote computer system using serialization and traceability as well as data management elements to effectively and transparently track reptile skins on item and part level in real-time and supports remote access, coupled with an authentication system that protects commercially sensitive information and may also manage user-specific privileges. Traceability data are available globally and at any time. Therefore, the system relies on a secure 24/7 database that can be easily accessed in real-time applying all kinds of connectivity solutions, such as cellphone standards or other network technologies. Information stored in the database covers the entire value chain of the skin-based product from the upstream hunters and/or farms all the way down to the final product, quasi from cradle to grave and beyond.

The invention comprises a number of advantageous elements which can be realised in different embodiments of the invention. Such features are, inter alia:

First, a skin representation that reliably extracted enables to identify a huge number of skins, covering the range of 10 to 10 billion individual skins, preferred 1'000 to 100 million individual skins, whereas the representation needs to be resistant to any kinds of skin treatment as it is key-element of the strongly robust tracking procedure across the whole supply chain and, whereas the representation can account for various damages in terms of surface, shape, or wrinkles. The numbers mentioned above are based on reasonable commercial aspect estimations and effective data handling in terms of speed and data volume, but are not a loss of generality. Various parts of representation are subject to different degree to damages. The most stable part is the shape and relative position of reptile skin scales. More exposed to damages and not present during whole supply chain is the wrinkles microstructure that are a characteristic feature at a certain step of a supply chain but are lost in a definite way when going to the next step of the supply chain. It is secure against any attempts of manipulation by illegal intervention, and whereas the representation is based on biometric elements of the visible parts of scale-type skin texture.

In some specific cases, skin representation can be converted in unique identifier UFI—unique fingerprint identifier. This conversion is conditioned by roughly same area of the skin that will be represented, by similar acquisition conditions and foreseeable number of skins.

Second, combination of value adding traceability features such as: skin quality control, central regulatory management and optimized farming, species identification, internal tracking, best cuts selection, human-eye perception of good looking skin part, suitability of symmetrical skin part for a bag, whereas the traceability features stay a stable and exhibit a high grade of recognition by technical and software means over the entire supply chain or at least in part of the supply chain, Third, open IT platform consisting on multi-server solutions respectively cloud solutions, namely amazon Web Service (AWS), Microsoft Azure, or other clouds from Google, Samsung or Huawei, etc. and smartphones, namely iPhone X, Galaxy S10, Huawei P20 or the like based on all common operation systems as 105 (Apple) or Android (Google), HongmengOS respectively HarmonyOS (Huawei), etc. but in principle also operation systems based on a proprietary solution enabling dedicated scanners for capturing the microstructure details of a reptile skin, Forth, high integrity in the supply chain filling formal obligations such as required documentation, taxes, custom declarations, CITES certificates, etc., as well as ensuring the authenticity of the skin product at each point of the supply chain.

Fifth, method and algorithm for reliable extraction of skin appearance in any acquisition conditions (using video, partial recognition, alignment based on partially overlapping data, composition of skin map from elements, user guidance at various acquisition conditions, detection of appearance features adaptive to ambient conditions).

Sixth, method steps and algorithm for reliable extraction of individual scales despite elements present inside scales (texture, reflections, broken borders, marks, salt, invisible edges, etc.).

Seventh, method steps and algorithm for building a grid of scales and measuring their properties.

Eighth, adjustment of scales shape to possible transformations that skin undergoes during supply chain or resistance to those deformations.

Ninth, method steps and algorithm for calculating the basis for recognition propagating through the grid of scales.

Tenth, several layers of recognition methods as macroscopic and microscopic, relying on invariant features and variant.

Eleventh, methods for calculating various features from resulting skin representation like "beautifulness" of certain parts for human eye.

FIG. 1 shows visible details on a reptile skin in three detail views in the range form 1 µm to 1000 µm (micrometer). The technical approach relies on the visible macroscopic skin appearance and microscopic surface structure and microscopic texture of the animal skin. Similar concepts are suggested by other publications related to paper, plastic, fabrics/textiles, leather, etc. In contrast to the other published methods this invention makes the analysis of surface structure covering the continuous scope from 1 micrometer to beyond few centimeters as FIG. 1 is utilizing different types of structure elements. Also, various specific geometric structures like scales are extracted.

First range 1 with a size ranging from 1 µm to 100 µm (micrometer) shows characteristics of the surface microstructure on the scales and in the gaps between the scales. Second range including 100 µm to few centimeters particularly shows characteristics of a plurality of reptile scales.

The smallest scale skin element 7" in the range from 1 micrometer to 5 micrometers shown in the upper detail view is characterized by the irregularity of edges of scales 4, gaps between scales and wrinkles 3 on the scale's surface raw reptile skin 12. The preferred image capturing device is a microscope respectively a hand-held microscope but also by special lenses or by special lens-camera combinations (reverse coupled lenses).

The second detail view of FIG. 1 shows a medium part of the first size spectrum or middle size scale skin element 7' which is already accessible by high resolutions image capturing devices such as cameras of state-of-the-art smartphones. Characteristic parameters of this medium part are the center point of scale 5 of and the shape of scale perimeter 6 of the scale.

The third detail view of FIG. 1 shows a high part of the spectrum, here in the beginning second range 2 in terms of the big size scale skin element 7 of the surface elements revealing parameters such as the assembly of a plurality of center point of scales 5 defining a multi-dimensional center point vectorbased on positions of scale centers 5 and links 11 between them. The definition of big size 7 is a detail view of an image of scales with a side length of 100 micrometer to 10 millimeter showing a plurality of scales with center point of scales 5. The reference numeral 11 is used for a point-to-point connection between two scale centers 5. The scale center 5 distribution and the link 11 distribution are specific for a reptile skin.

Geometric relative position between scales centers 5 is a non-directional graph (mathematical structure with nodes connected by lines/connections). Nodes (e.g. scale centers 5) can have properties like coordinates or size and connections (i.e. links 11 between scale centers 5) can have properties. In the present case with a regular grid, such graph would have a meta-layer of information where probability of frequency or scales distribution would be stored. So, this is related to a probabilistic graph.

Figure 2:
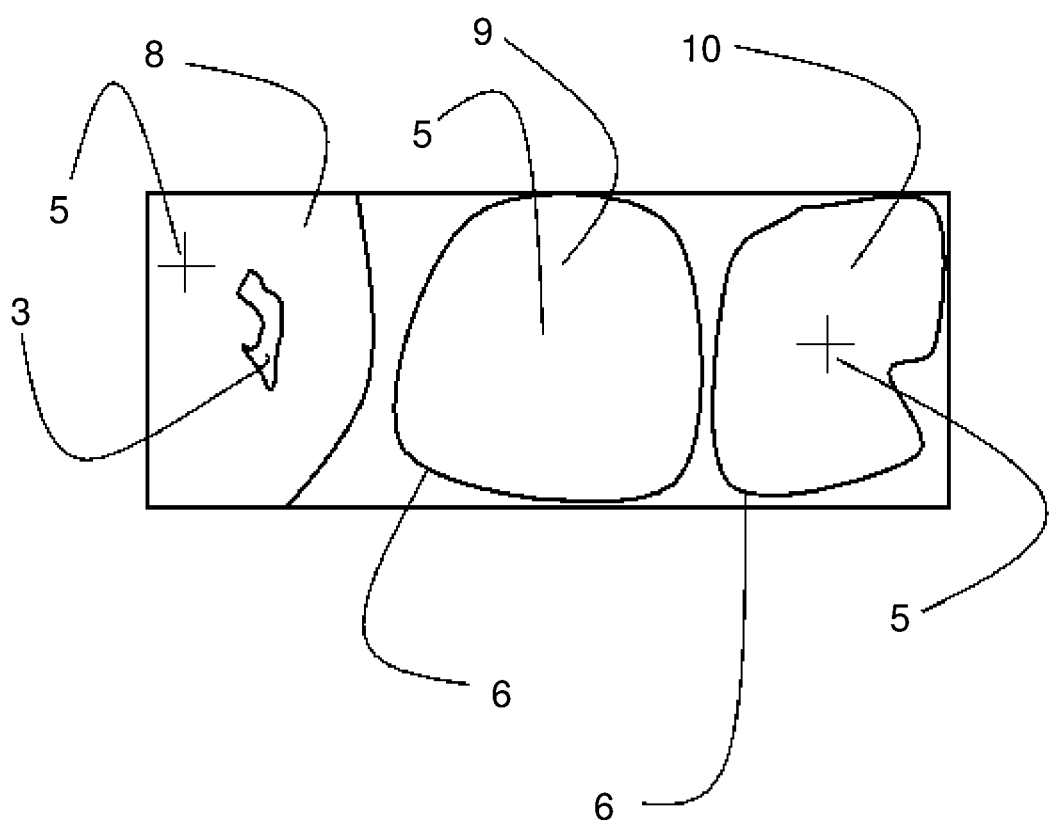
FIG. 2 shows camera takes of microscopic details of a scale and of an assembly of scales in three different sizes.

FIG. 2 shows the relationship of the microscopic levels in the form of real camera takes corresponding to FIG. 1. The camera can be from a smartphone as mentioned above. Then the following method can be executed by the processor in the smart phone. Any data taken as basis data for performing the method steps is stored in a memory in the smartphone, Acquired data can be stored in further memory in the smartphone. It is also possible that calculations and storage space is not used more than necessary to use the camera in the smartphone but is provided by webservices and is a directed by a remote processor. Every time that the term "method step" is used in the present application, it is related to a method executed by a computer processor through a computer program provided for this effect in the storage of the computer device. The computer program can be provided in the mobile device taking the photograph or the mobile device hosts just an image taking program and transfers the image(s) for all other calculation steps to a remote computer and only receives back the information, that in the case of an enrollment of a reptile skin, the enrollment and data gathering was successful and in the case of a check of a reptile skin part, that the part is recognized or not.

Same features have received identical reference numerals as the center of scales 5, whereas the three scales shown are numbered: for the first scale 8, a second scale 9 and a third scale 10. Since scale sizes are usually between 5 mm to 4 cm, the image size here can be 5 millimeter times 2 centimeter to 4 centimeter times 12 centimeter. For a better understanding, FIG. 2 shows a stylized cut-out of the reptile skin on a medium-level accessible by high-res cameras. The side length of a few scales are represented with scales 8, 9 and 10. The representation displayed in FIG. 2 shows the smoothed shapes of the shape of scale perimeter 6 that varies from scale to scale in an apparently random way and a center point of scale 5. The unique pattern of the arrangement of a selected plurality of center points defines a dimension of fingerprint of a distinct reptile skin.

Figure 3:
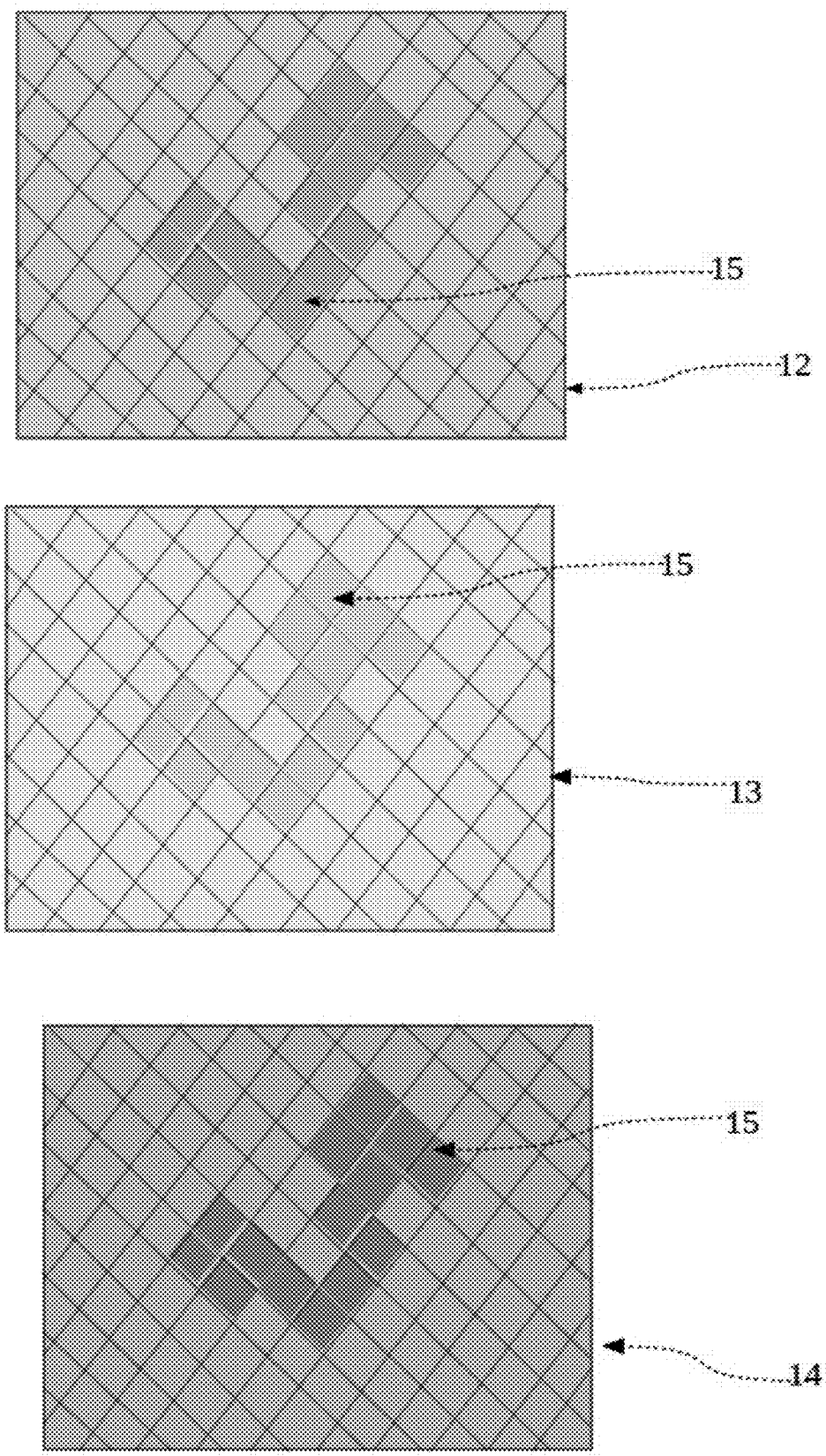
FIG. 3 shows three camera takes of microscopic details of a scale or an assembly of scales.

Another fingerprint dimension evolves from a selected plurality of specific shaped perimeters of the corresponding scales. Representations of reptile skins in different steps of production are exhibited on drawing FIG. 3, comprising a raw reptile skin 12 prepared soon after slaughtering of an individual animal, a pre-tanned skin 13 as well as a leather surface 14 made from the same individual cut-out from the same individual animal. At least a part of the scales structure 15 stays invariant over all steps of processing of the reptile skin. The invariant structure element is specified in the course of an enrollment stadium as soon as the reptile has formed the typical scale-type skin. Therefore, the enrollment has to be done by the reptile breeders. In case of legal hunt of an individual animal the enrollment needs to be done by the hunter or the delivery station, respectively, where the reptile body or skin is brought into the supply chain. It is supposed that the area 15 can be identified by the user performing the enrollment, if this is a relevant body part. Otherwise more parts until most surface of the skin of the reptile can be scanned and then every cut body part can be identified.

Figure 4:
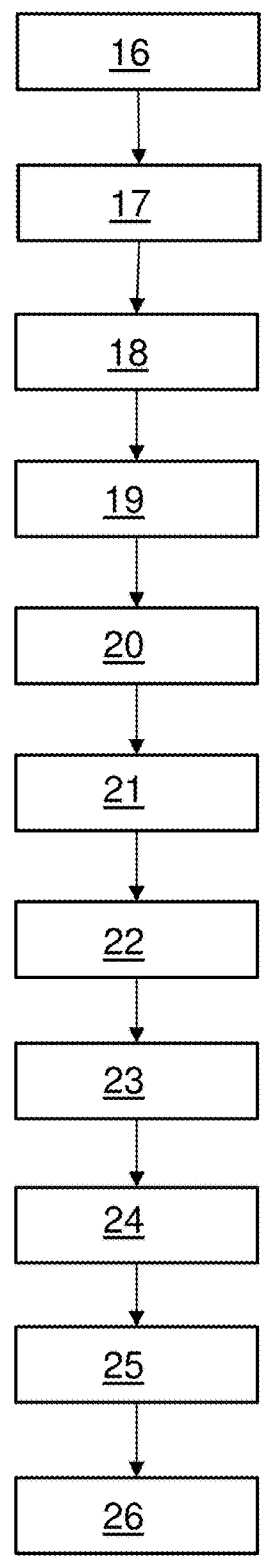
FIG. 4 shows main steps of the method of interaction between identification system and supply chain.

The main steps of the method of interaction between identification system and supply chain are displayed in FIG. 4. Steps of Enrollment of main skin part on animal 16, verification of animal 17, verification of main skin part 18, enrollment of full raw skin 19, verification of raw skin 20, tanning 21, verification of tanned skin 22, enrollment of whole skin macro/micro level 23, cutting 24, verification of skin parts 25, and finally verification of final product 26, indicate at which moments in time skin or its parts will be enrolled and at which moment it could or should be verified. Any check with does not confirm the current verification step leads to the exclusion of the respective reptile skin part. In other words, the later described enrollment process, which is part of the computerized method, can take place at any space it time between a verification of animal 17 until verification of the final product 26. Verification of animal 17 means check of the animal at any stage of his living (of course outside the egg for oviparous reptiles or the mother's body in case of viviparous reptiles).

Figure 5:
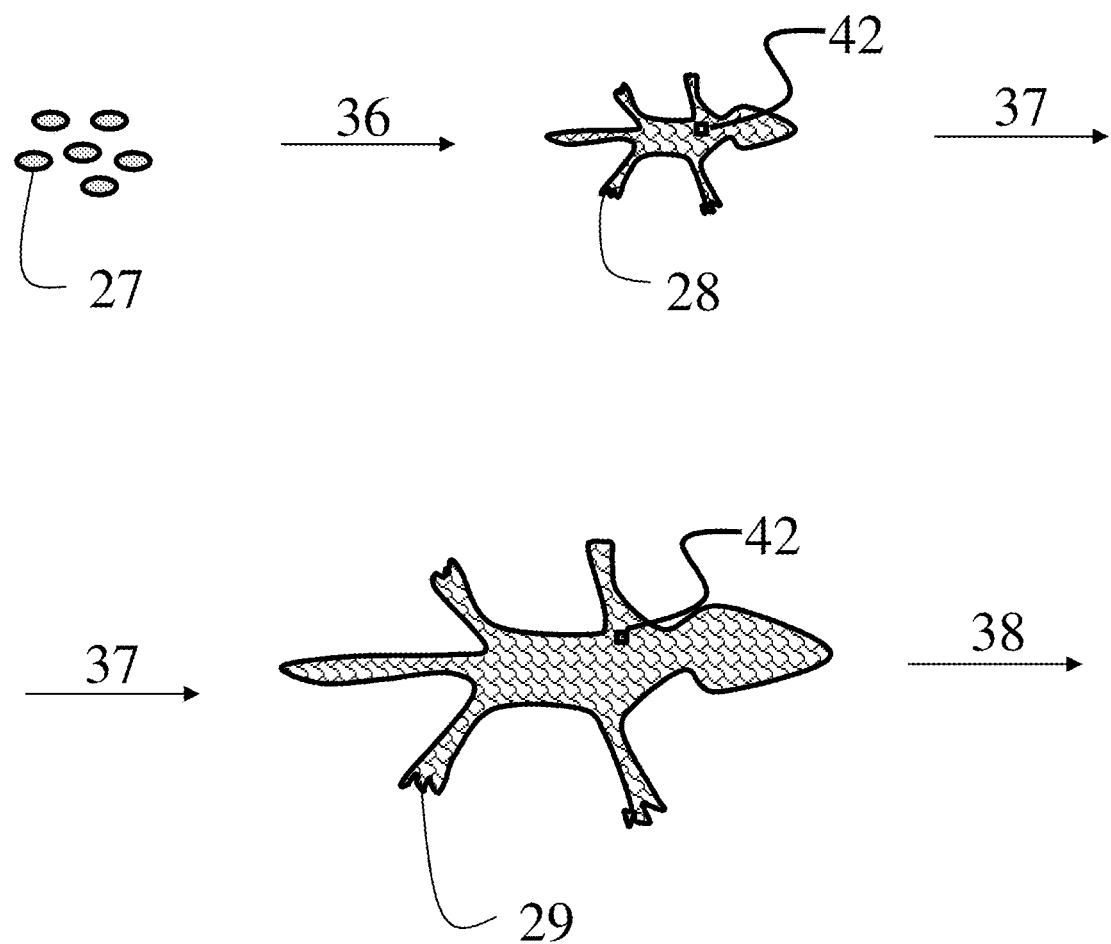
FIG. 5 shows the first part of the development of the final skin product over steps across the supply chain.
Figure 6:
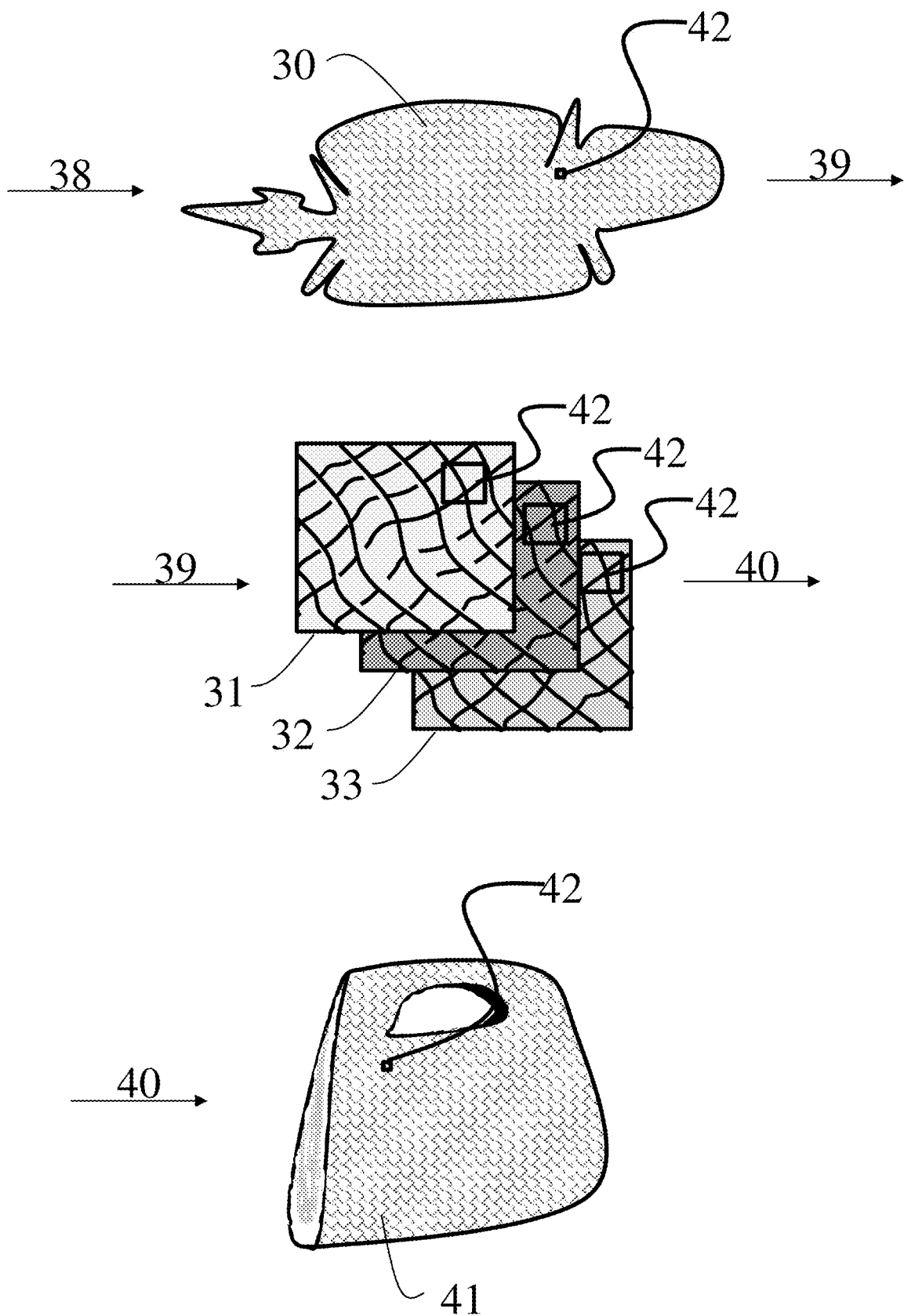
FIG. 6 shows the second part development of the final skin product over steps across the supply chain, following FIG. 5.

In contrast to this block diagram of FIG. 4, FIG. 5 and FIG. 6 visualize in two parts the lifecycle of a reptile skin from egg 27 to hatchling 28, to young animal 29, to skin 30, to different parts skin part, i.e. first stage 31 of skin part, second stage 32 of skin part and third stage of skin part, as raw skin over tanned skin to further worked skin, to the final product final product 41. Transformation steps include the transformation egg-to-hatchling 36, hatchling to young animal 37, prepared skin 38, skin parts and painting 39, tanning and painting between the different stages 31, 32 and 33 of the skin part as well as object manufacturing 40. Whereas the reptile skin is or can be enrolled soon after formation of invariant elements area identified 42 in the scale structure of the reptile's skin, i.e. at stage of hatchling 28.

The area containing the invariant elements (or elements co-variant with some transformations during supply chain) to be analyzed at each step by means of an image capturing device is called fingerprint area. The position of the fingerprint area is indicated by the characteristic pattern 15 generated by the arrangement at a size of a plurality of scales which can detected easily even by low-res cameras.

The digital fingerprint accessible by medium-res to low-res image capturing devices are specified by the sizes and shapes of single individual scales and the sizes and shapes of and arrangements of a plurality of selected single individual scales 5 providing the vector due to their neighborhood properties.

Figure 7A:
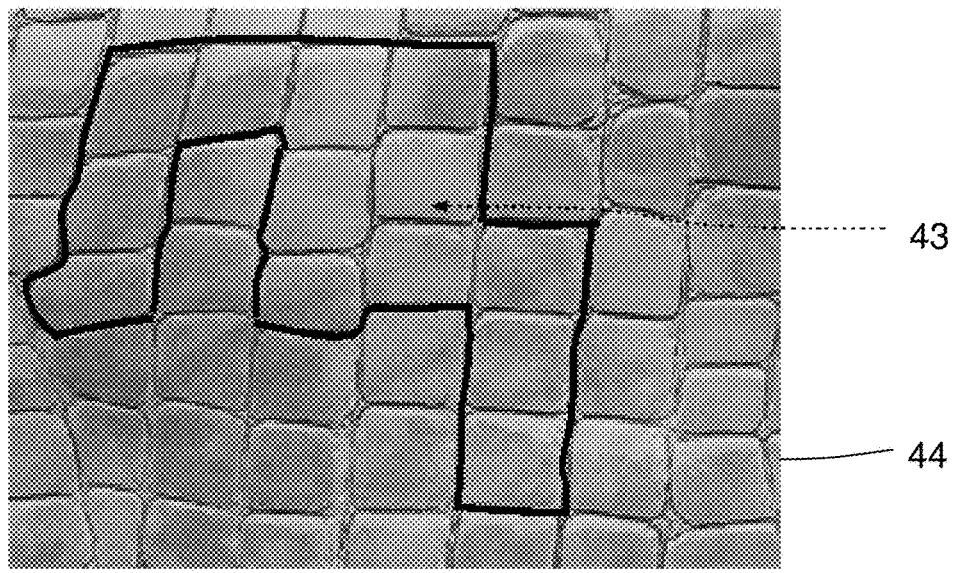
FIG. 7A to 7C show areas of the skin 7A) in photograph, 7B) as simplified drawing and 7C) as photo of the final product as a belt.
Figure 7B:
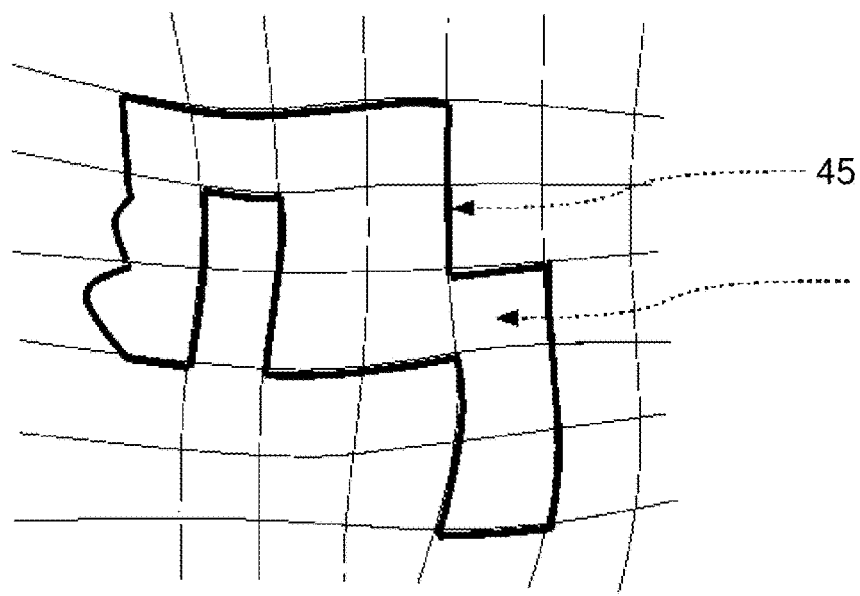
Figure 7C:
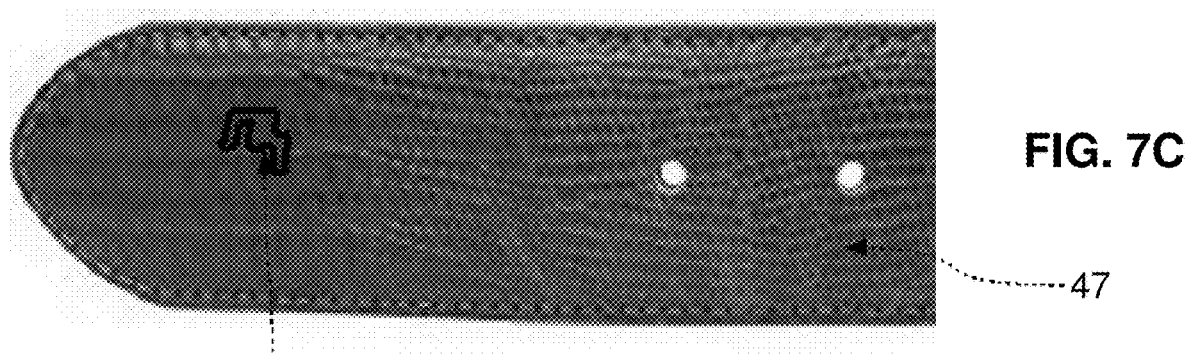

FIG. 7A to 7C exhibits a specific shape arising from a contiguous set of scales at a defined position on the reptile skin area in FIG. 7A on skin 43 and delimited by border of area 44. Reflected in skin representation in FIG. 7B also based on scales, those elements correspond to a perimeter representation area border 45 around such a set of scales area represented 46. Such representation can later be related as in FIG. 7C to an area on final product 48 on the final product 47. The added value of the technology is that an area on final product could at the end be identified as coming from a certain part of known skin, identified as skin part of a hatchling 28.

Visual appearance of a skin evolves along steps of it lifetime: hatchling, young animal, adult animal, skin, salted skin, dried skin, tanned skin, painted skin, processed skin. Different elements of this appearance exist during various stages of supply chain as outlined in FIG. 5. Scales outlines is the most representative information. They resist across the whole lifetime of a skin and undergo only limited deterioration. Disadvantage is that it requires bigger area to describe a skin. Color or texture of scales or inside scales is a quite distinctive information but it disappears after tanning and cannot be relied upon in general. Wrinkles along scales outlines on the contrary appear after tanning and bear quite extensive information about skin area. Especially when cut into bracelets those wrinkles would allow to identify a skin.

Business processes behind using skin appearance as identification include acquisition of whole or parts of a skin at one or multiple steps of the supply chain and storing or updating information about it in local or central database. Also, verifying skin appearance of whole skin or its parts to be belonging to a stored skin. The goals are identification of whole or piece of a skin belonging to one skin.

The method according to the invention comprises building/extracting a robust representation of a skin and using that representation to identify a skin or its part and do some added value services like quality check or selection of right area for bracelets. It is possible to initially enroll the hatchling 28 with a specific body part 15 and only after a check of the treated skin, e.g. as skin 30 or in one of the stages 31 to 33, i.e. as check of the entire animal, to cut the skin into pieces and to re-enroll it for parts, i.e. to re-enroll each cut-out part and connect it with the originally enrolled total skin identification. Then it is possible to trace portions being used in a bag 41 or in a belt 47, where identification portion 48 is of course different to identification portion 42.

The technical description of the method is presented below and is composed of following sections: method overview; image acquisition, and initial candidates.

The method should operate in acquisition conditions perimeter. This includes: any light, any phone, any/majority of skin conditions.

Figure 8A:
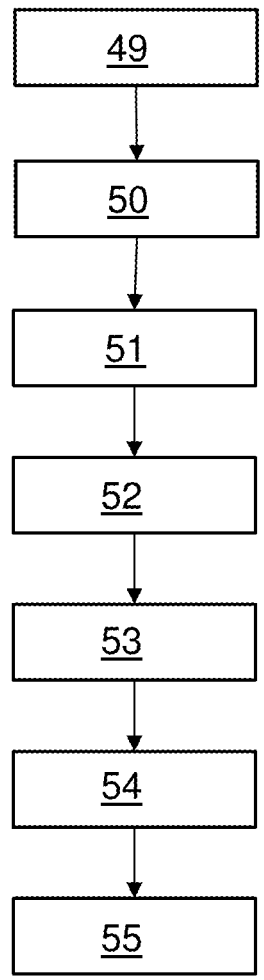
FIGS. 8A & 8B show in 8A) a flow chart of the method algorithm overview and in 8B) sub-steps of the second of the method steps of 8A)
Figure 8B:
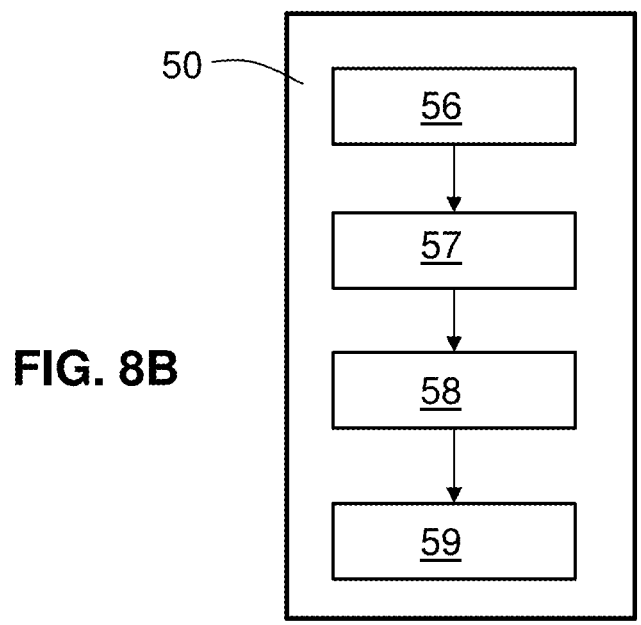

The method of skin representation extraction is outlined in FIGS. 8A and 8B as a method overview. FIG. 8 shows in 8A) a flow chart of the method algorithm overview steps 49 to 55 and in 8B) sub-steps of the second step 50 of the method steps of 8A).

The first step acquisition 49 is responsible for image or video acquisition step. It does not rely on smartphone capacity to select parameters. Essentially exposure and focus are set in the app according to a proprietary adaptive focusing algorithm to set the focus where needed and not rely on phone. Focus will be targeting to reveal sharp details of each of the skin elements (scale border, wrinkles, smooth changes of surface depth inside scales). Guiding the focus to reveal those elements in image will be based on scales shape, deformation of the skin at the level of several scales, sharpness of scale borders, sharpness of wrinkles. It is an option that instead of one focal position for each feature, there will be a range of focusing planes and properties of wrinkles e.g. will be expressed as geometric structure whose representation spans several focal planes. To a lesser extent, white balance and image resolution are selected. It is preferred to use the raw image format.

In video mode, real-time feedback for the quality of the video being acquired is constantly provided to a user as a guidance. During video those parameters are measured from video frames and image metadata at speed between 1 and 120 frames per second. Parameters measured from video are: focus and consequently distance at which skin is from phone, light sufficiency, color of skin, presence of reflections, but this not a limiting list. The result of the first step is a video or image sequence which is of sufficient quality to be handled in the next step. The result of step 49 is at least one image to be handled subsequently.

The second step of the algorithm is the scale candidate step 50. The goal of this step is to find initial scales positions based only on local properties of each scale. Initial scales positions means that no information that is external to scale perimeter contributes or influences the detection of scale border. In other words, detection of scale is done based only on information that is available around scale border (thus term "local"). On the contrary, at later stage, if one scale does not have a complete border and cannot be detected locally as above, and its neighbors were all detected, information from neighbors optionally allows to reinforce the confidence where the scale border at this position should occur and its detection could be done even if locally some information is missing. Thus context information can be used at later stage to detect a scale. For understanding, the opposite would be using properties of neighbors of scales to detect all scales. As explained above, one scale could have only 20% of its border visible in an image and cannot be thus detected by itself. However, neighboring scales can be detected and exhibit their positions, sizes, orientation, shape (square, round, rhomboid). Relative positions of scales in a group could suggest from probability point of view where other scales should be and support a hypothesis to detect a scale where only such 20% of border is available. Of course 20% is just an example and would usually relate to the fact that only one out of four more or less rectangular scale borders can be detected directly. The result of the second step is a set of scales detected individually, the probability graph of detected scales and by consequence, expected positions and properties of undetected scales, and the newly detected scales from partial local information reinforced by confidence taken from neighbors.

The third step of the algorithm is a build grid graph step 51. It corresponds to building a grid of scales and computing properties of that grid like repetitivity of scales and distribution of their sizes and evolution of their properties with directions. The outcome of this step is a graph where scales are nodes and arcs are adjacency links to neighboring scales. Every scale is characterized by its geometrical properties and evolution of properties along evolution directions and probability map for centers. In the present context geometrical properties are related to the fact that each scale is represented by its center of mass or geometrical center, by distinctive shape description parameters like ellipse major and minor axes and properties of its outline that can be represented with simply points at given resolution, vector curve approximating the border and parameters of various shape representation techniques. Evolution means that grid of scales cannot have small-big-small-big sequence of scales in one direction and there is either a uniformity of scales geometrical properties evolution/propagation corresponding to roughly same orientations and same sizes or a clear frontier of properties corresponding to transition between e.g. belly area and side area with square scales replaced by round ones. The probability of map for centers relate to the fact that if one builds a graph of scales centers it will correspond to a grid with steps between center of scales that is more or less of same size if scales are of same size. Therefore, it would be possible to build a probability of encountering a scale at given position based on the grid properties. This is here labeled as "map of centers".

The fourth step of the method is recompute scales step 52. It corresponds to trying to find additional scales where the grid probability predicts them. As the skin of an animal is not known at the moment of recognition, the probability of scales positions is based only on scales existing and visible in an image. So, probability map or grid probability is constructed from scales that were detected in an image and could serve as a base for building a grid. In other words, preferably scales which are to be detected, since border parts are missing or not clear, are not used as starting points scales. This step occurs to recover scales that are not great and where graph of scales presents gaps. In other words, this step tries to identify and recognize additional scales from the image taken in the first step, where the second step failed to determine existence of a scale but the gap is not a gap between scales but a non-detected scale. Some of the scales at the first steps were not detected based on local information only that can be incomplete e.g. only 20% of the border. At the level of grid or probability map construction, one obtains prediction or expectation that given the observed positions of detected scales, it is very likely that this kind of grid is in place and it's very likely/probable that at some positions scales should be present, but were not detected at first step. Grid also provides not only the probability of position, but also probability of orientation and size. With that knowledge, re-detection of scales with more certainty about which scale are detected becomes possible. It is considered that the re-detection step is a mandatory step in the method according to the invention improving the overall scale detection quality.

The fifth step is build outlines step 53, allowing to build a precise outline of each scale based on several criteria and adjacency constraints. They are reflected later in the present description with the description of FIG. 15pp. In short, these are criteria (or constraints) that are consistent with scales on reptile skins. Those are related to geometry of the scale (like smoothness), of correspondence to high gradient in image and adjacency. The outcome of this step is precise representation of each scale by its geometry. Here, precise means geometrical representation of scale shapes that reflects its properties up to details of defined size, preferably up to 500 microns.

Once skin representation is built, recognition could occur with recognize step 54 that is composed of several sub-steps as explained below.

Finally, the validation step 55 is responsible for detailed validation of relative scales positions. Skin recognition is accompanied with a certain level of tolerance. Once skin was recognized, one can go through detailed validation that can be seen as a more detailed comparison between two representations with higher degree of precision. If initial recognition has speed as a goal, this validation verifies if differences between two representations can be classified as coming from stretching or cuts or tanning. So validation is a step where two skin representation are compared to be identical over certain area and differences can be classified as reasonable.

FIG. 8 shows in FIG. 8B the determination of scales candidates. In more details, the scale candidate step 50 is shown in lower part of the FIG. 8B. This step of the method contains three stages with a closing step: Extracting edge features in the edge feature step 56, defining elements that vote for scales/convex structures in element-that-votes step 57 and, voting in a voting step 58 and finally vote accumulation in a vote accumulation step 59.

Figure 9:
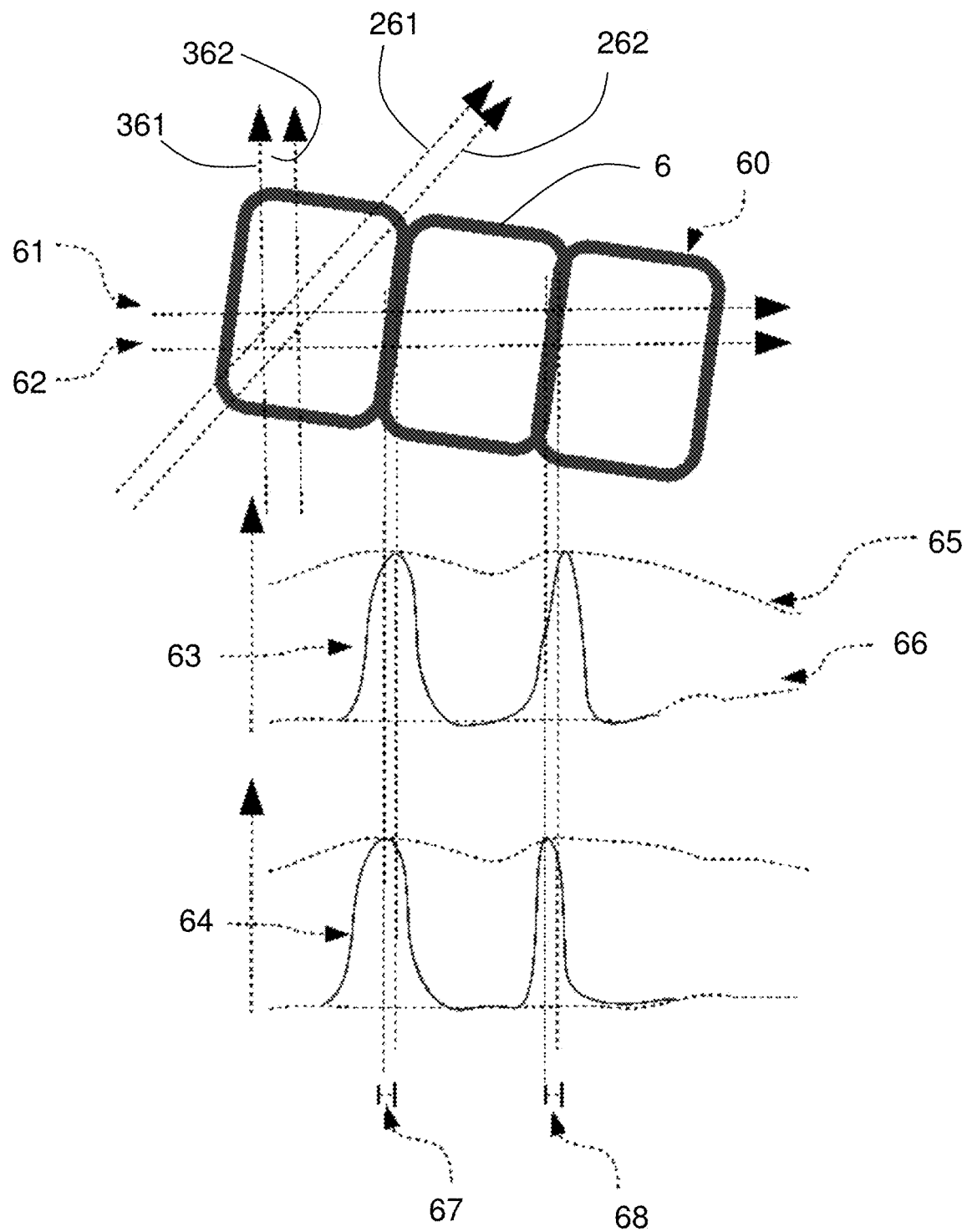
FIG. 9 shows a series of scales with the detection of edge features according to a step mentioned in FIG. 8B)
Figure 10:
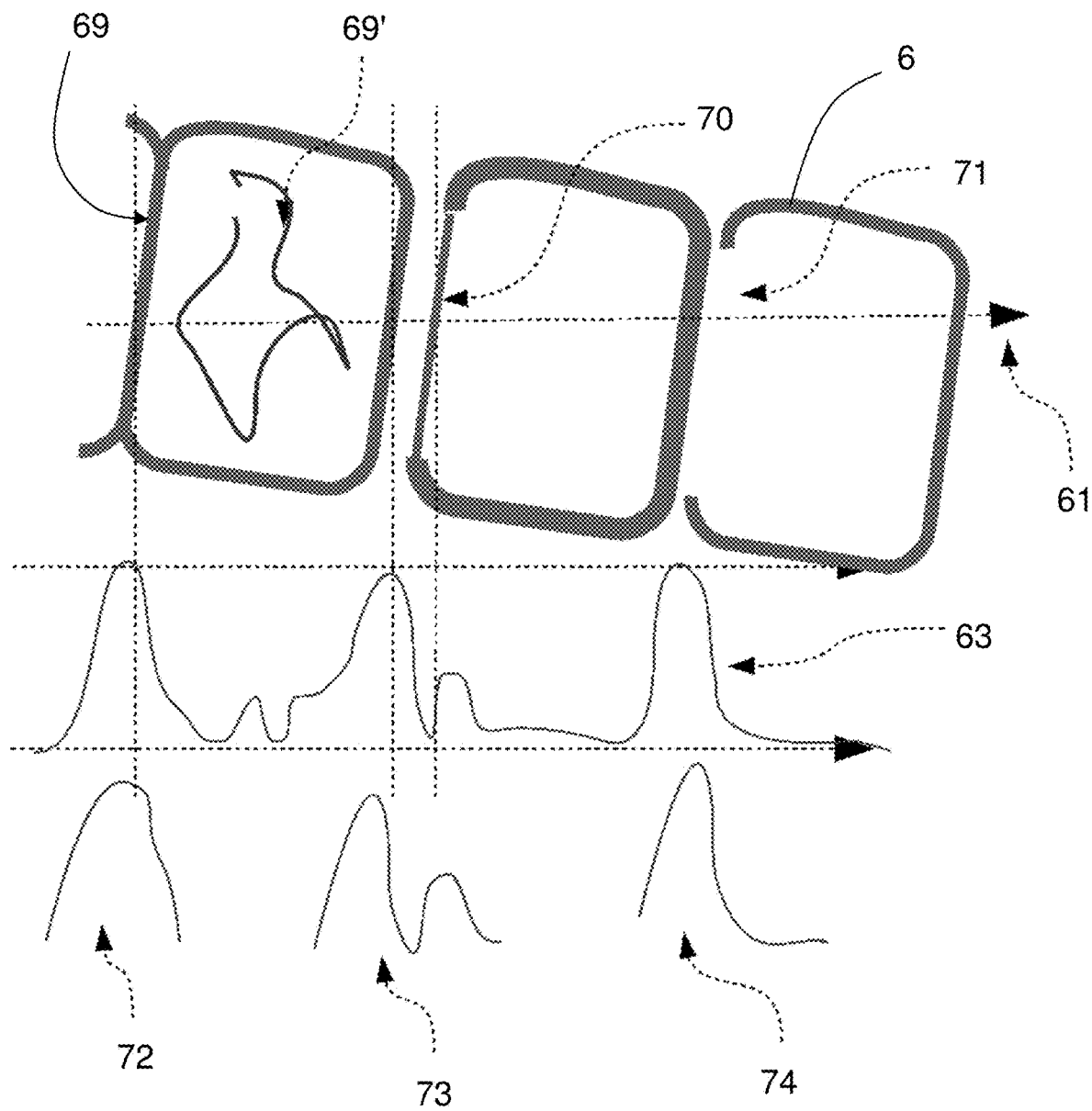
FIG. 10 shows elements that are identified to vote in a voting step as mentioned in FIG. 8B)

The edge features detection step 56 is performed with one-dimensional scans of the image as shown on FIG. 9 and FIG. 10. It can be without loss of generality replaced with standard 2D filters, comprising edge-detection operation in image processing with adaptable parameters that can reveal scales properties like border, wrinkles or texture. In FIG. 9 an image showing three "image elements" one beside the other being scanned with a first scanline 61 and scanned with a second scanline 62. Intensity or color profiles corresponding to those scanlines are the first color profile 63 and the second color profile 64. One, two or more scanlines as these scanlines 61 and 62 could be provided and performed simultaneously or in a sequence. The scanlines 61 and 62 are parallel one to the other. Non parallel scanlines are possible but necessitate further calculations.

For each scanline 61 and 62, the processor computes the maximum and minimum envelope that is limited by local weighted maximum 65 and local weighted minimum 66, shown for the first scanline 61. This envelope can be evaluated for each scanline 61, 62 or could share information between scanlines 61, 62. Values for envelope can be calculated with variable density of sampling.

Edge of the objects like scales in an image are first detected as intensity or color transitions with respect to the envelope. Different size of such transitions could be accepted. Without the loss of generality, a simple first edge transition pair (edgelet) 67 and a second edge transition pair (edgelet) 68 can be detected as two neighbor transitions along two scanlines that can be placed at various space, preferably parallel distance, between them. It should be noted that multiple combinations of transitions can give multiple hypothesized edges. It should also be noted that double transition bears such useful information as edge orientation. Raising or falling transitions are distinguished for the different scanlines 61, 62 and this information stored.

First and second diagonal scanlines 261 and 262 are shown to indicate that also different scanlines are possible providing different answers. Corner information is less preferred.

First and second perpendicular scanlines 361 and 362 are shown to indicate that also scanlines perpendicular to the first scanline 61 can be used which would generate similar side information as curves 63 and 64.

Depending on image acquisition and skin type, various combinations could be foreseen as shown in FIG. 10. Edge of a scale 69 could be shared by two neighboring scales; a scale can contain artifacts 69'; there can be a weak edge 70 when contrast is low or various edges of each scales are different and there can be an absent edge 71 when edge is seen only on one side of the scale.

The first scanline 61 produces the first color profile 63 and this exhibits several types of transitions. In this case first transition type 72 has clear raising and falling transitions. In the next case along scanline 61 the second transition type 73 has one clear double transition wherein one is not very prominent. In the case of the third transition type 74 a clear single transition is followed by absence of any transition for next scale.

Figure 11A:
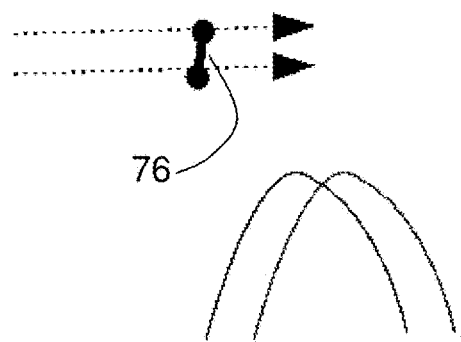
FIG. 11A to 11C show in three steps how the voting step from FIG. 8B) is prepared based on scan line results from FIG. 10.
Figure 11B:
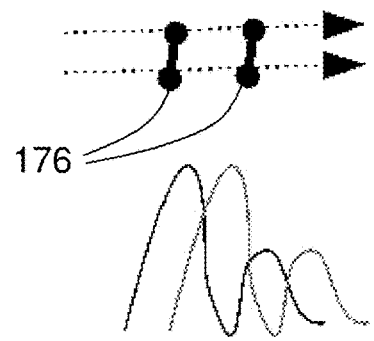

Once the step above, i.e. the edge feature detection step 56 is accomplished, the next step in the module of the scale candidates step 50 is the identification of element-that-votes step 57. In computer vision there is always a compromise between grouping features to make a more certain vote or make more broad votes based on less reliable small features. Here, several possible voting options are presented. The first stage of voting is to have a pair of edges. Edges are identified along scanlines as shown in FIGS. 11A and 11B and several edges are detected along a scanline in FIG. 11C. It is noted that two scanlines clearly give information about edge orientation and preferred. Using scanlines instead of edge detection filters, then scanlines offer a very important speed advantage over edge detection, but both approaches can be used. In other words, using scanlines is one specific embodiment of detecting border of scales but being more performant than the also mentioned edge detection filters. As at this stage, scale is not known, such edges can belong to anything: scale border, reflection, texture, mark, as explained in connection with FIG. 10.

FIG. 11A shows a selection of single transition with transition pair 76 characterized by several properties that selects it from a set of transitions. First, the height of the transition should have some similarity as originating from one edge. Color properties of scale border have to be similar as well i.e. if it's a brown texture, then two profiles should have similar transition from one color to another. On the contrary, transitions from minor objects like wrinkles will exhibit rather varying properties between scanlines and can be discarded. Of course transition should be raising or falling slope on both profiles. Width of transition that can be measured in simplest embodiment as distance between reaching maximum on one side and minimum on the other. Two transitions should, thus have similar width.

FIG. 11B shows a double transition pair 176 characterized by similar intensity/color profile, raising or falling slope, similar shape and acceptable width. The second scale border is less visible than the first one.

Figure 11C:
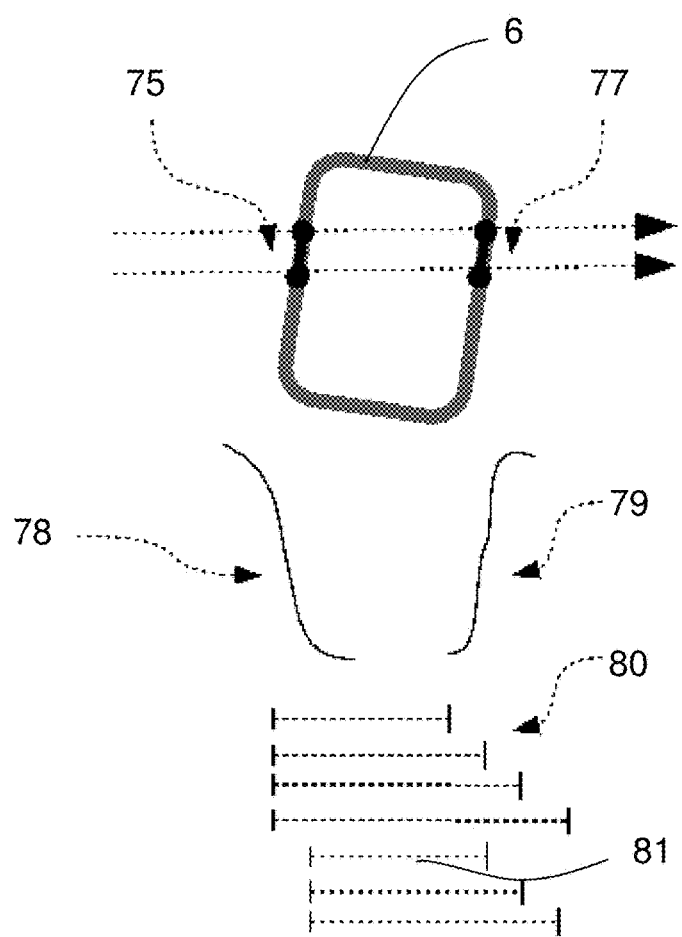

FIG. 11C shows a first edge (point pair) 75 and Second edge (point pair) 77 selected/paired if they have some specific properties. Such properties can be distance between them which should be within reasonable range that scale size could exhibit given types of skins and distance from smartphone. Second condition is that intensity or color slopes directly in image color space should be complementary. In general, falling slope 78 and raising slope 79 should be present, but in some cases two slopes of same type are selected. Combinations of edges pairs along a pair or more scanlines produces possible pairs 80 of edges. The selected pair of edges receives the reference numeral 81.

Figure 12A:
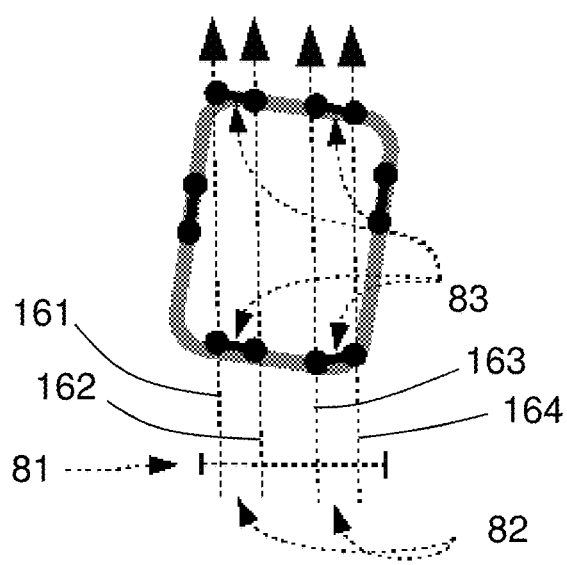
FIG. 12A to 12C show three possible voting elements.
Figure 12B:
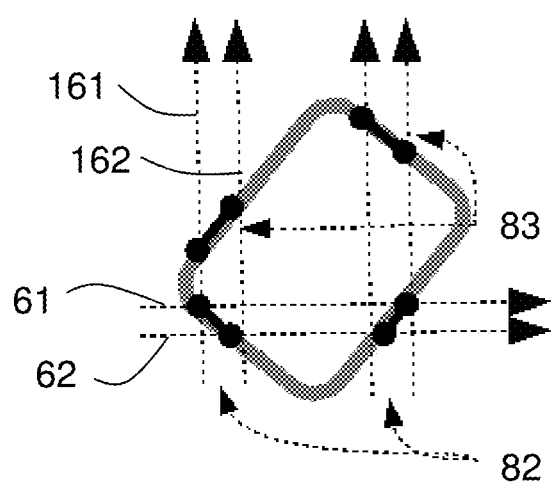
Figure 12C:
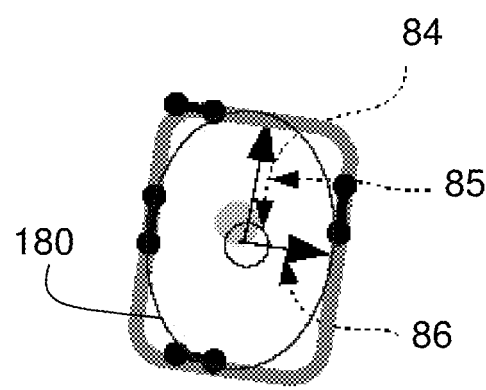

FIG. 12 is used to explain how the voting step 58 is triggered and performed. In the upper a) part, two initial edges forming a primary pair selected edge pair 81 will be the basis of vote. Depending on their orientation two possibilities exist. If their orientation is similar to each other as shown in upper a) part they could potential come from opposite walls of the scale. Their counterpart secondary edges will be seek along vertical scan 82 which is effected with four secondary scan lines 161, 162, 163, 164 which are perpendicular to the primary scanline 61 (not shown in FIG. 12A to 12C) and placed roughly in the middle between primary edges pair. Secondary edges 83 obtained from secondary scanline will be subject to complementary filtering.

In case where the selected edge pair 81 exhibit a different orientation, as shown in FIG. 12 *b*), the complementary secondary vertical scan 82 will be performed still perpendicular to original scanline, but at locations where primary edges 81 were found to obtain secondary edges 83. Since a scan line does only mean that image data from a still image is analyzed along a specific line, this switch to different scan lines can be achieved quickly. The horizontal two scanlines 61, 62 reveal that edges (pair of transitions) have a different orientation and are not parallel. At location of those pairs, vertical scan with inter alia scanlines 161, 162 is performed.

Once three or four sides of a scale were identified, FIG. 12C, one can see how voting is stored. An ellipse 180 is selected to represent the scale as the most compact structure and most useful for next steps. Ellipse hypothesis is stored with ellipse center 84, ellipse major axis 85 and ellipse minor axis 86. This set of parameters represents one hypothesis of a scale with minimum set of data representing the whole. The outcome of this step is a set of numerous ellipses 180 that represent individual scales built from their local structure. It will be the case that many ellipses voted for artifacts and all set of generated ellipses have to be filtered for such votes that correspond to scales.

An optional step of the method is once the hypothesis of a scale is confirmed by few consistent votes, a guided verification process is triggered. In this case, various scale outline properties are verified. Hypothesis of a scale means that the detected data defines a scale of the image taken by the smartphone.

Figure 14:
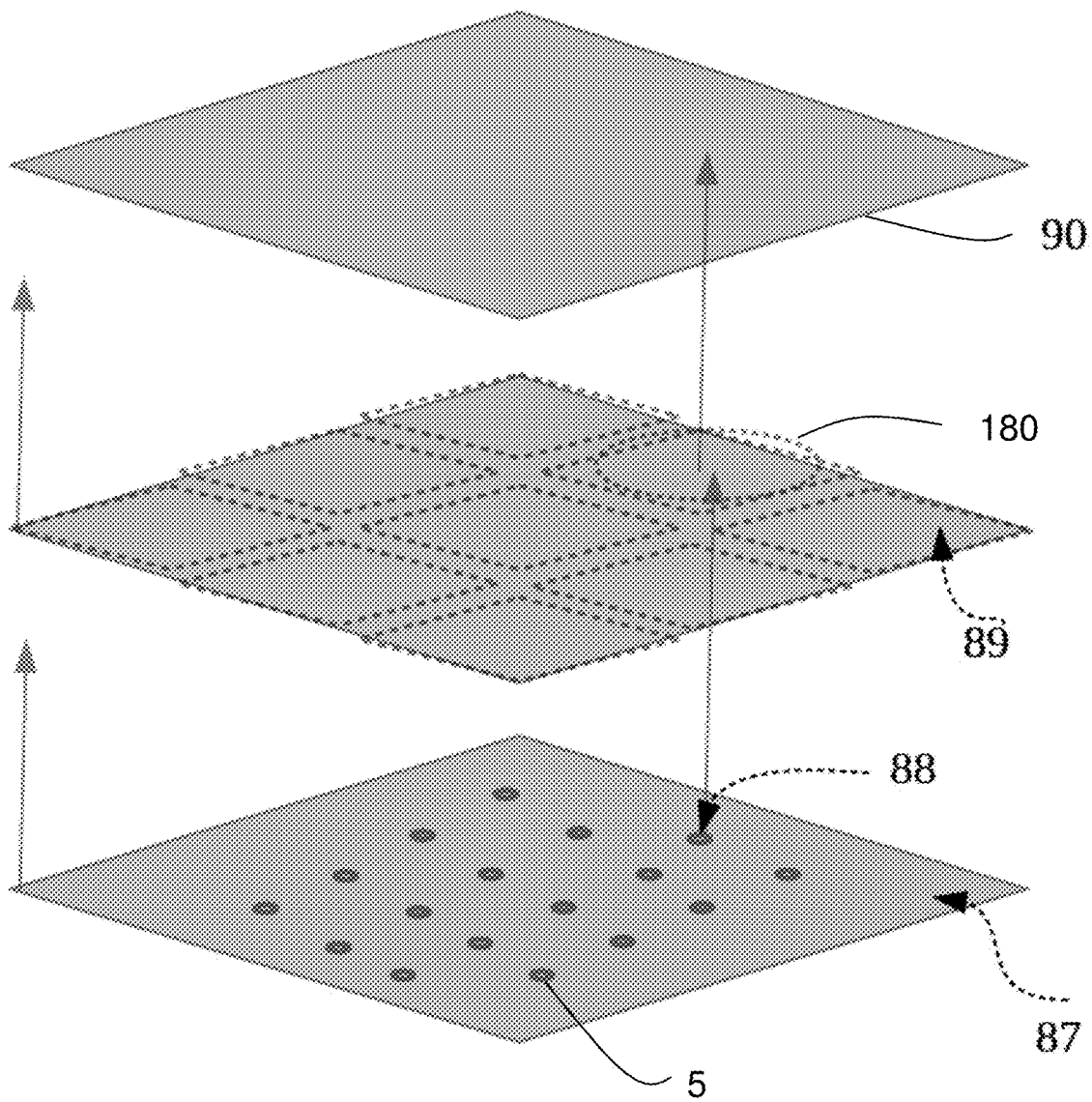
FIG. 14 shows three planes in view of the accumulation/clustering of ellipses.

The next step of the method is the vote accumulation step 59. Several variants are embodiments according to the invention. Each vote for a scale is stored in a form of an ellipse 180 that describes position (center), two main axes 85 and 86 that describe height and width of a scale. Major axis also gives orientation, if scale is not square and thus ellipse is a circle. As illustrated in FIG. 14 it can be seen as 2D map with center position as x,y key and value of two axes and orientation stored as payload in the map. Explanation refers to a data structure (called map) that is accessed with x,y coordinates and stores a value. Voted ellipses 180 could be indexed/accessed/selected with their center 5 coordinate first (lowest plane). This selection can be performed with tolerance i.e. finding all ellipses with center 5 in a given area defined as rectangle, circle or else. Once group of ellipses 180 was selected based on a pair of coordinates x,y, they can be clustered based on their size and orientation for consistency (second plane). Out of each cluster/group one can select ellipses that have the scale border edge votes sufficiently present along the ellipse border and thus correspond to a most complete scale. In other words, accumulation occurs by clustering in map of centers 87 ellipses by their center first grouping votes one ellipse vote 88 that geographically located close to each other to certain extent. This can be achieved by binning for speed or a more elaborate method of trees. For each group clustered ellipse votes, separation by properties like major and minor axes and orientation filtering by axes 89 are done. One scale, triggering several ellipse votes, would correspond to a peak of votes in x,y space at its center location. Filtering those votes for consistency with respect scale size, gives votes for specific scale size. Certain number of votes for roughly same center location, with same major and minor axes correspond to a valid hypotheses of a skin scale. This hypothesis could be caused by artifact in some cases, but satisfy criteria of convexity and size. Ellipses are accessed/selected by x,y center which is the most representative and spatially 2D important information. By defining a range of x1 . . . x2 and y1 . . . y2 all ellipses are fetched that have their center in that interval. In second step, parameters/dimensions like major axis, minor axis and orientation of ellipse can be used. They reflect size and orientation. Therefore, ellipses selected by x,y coordinates can further be separated in groups/clusters based e.g. first on their orientation or on size of major axis. In third step, if a group of e.g. hundred 100 ellipses have similar x,y center, similar orientation, similar major and minor axis, the distribution of edges is checked that voted along their perimeter. So, overall, it's an order of ellipse properties for their clustering and validation of scale vote. This is filtering by orientation 90 providing the remaining ellipses.

Additional check is performed as to elements that votes for this ellipse to have initial idea about distribution of edges that votes for this ellipse. The outcome of the phase vote accumulation step 59 is a set of ellipses for which sufficient amount of consistent votes was cast.

The following step is the build grid graph step 51 moving one level up in hierarchy of representation and builds a graph whose nodes are scales and whose links define neighborhoods between scales. In previous steps ellipses were generated based on their local properties and each scale was identified as a convex contour (that can contain any kind of artifacts inside). The skin has, however, a very strong property of scales that are repetitive and consistently positioned in two directions (which creates well recognizable python or crocodile pattern). FIG. 13A to 13C shows that neighborhood to one ellipse is defined first by distance to close ones. Criterion used is a distance to centers where threshold is defined by size of the central ellipse and could roughly be three times diameter of the ellipse to be able to reach small cells near big ones. It's rare that neighboring scales are 4× larger than their neighbor for biological reasons. Therefore, a reasonable (but without loss of generality) search radius is 3× a diameter. In FIG. 13A central ellipse 91 evaluates distance to all possible neighbors ellipses 92 to build initial adjacency relationship that includes all possibilities.

The next step is filtering neighbor adjacency by applying two conditions. Neighbors should not overlap and they should share a border proximity 93 within limits proportional to sizes of ellipses that are adjacent. In FIG. 13B one can see that after applying this step neighbors of central ellipse 91 are only those that can correspond to real scales (that cannot overlap in reality). This adjacency condition could be evaluated either on ellipses or parts of the border existing from voting part. This current state of adjacency could still contain ellipses corresponding to real scales and ellipses provoked by some artifacts like reflection or texture or double scale, but adjacency relationship links only ellipses that are non-overlapping and from their size could reflect scales. Therefore, the calculated ellipses 91, 92 on the left side of FIG. 13B are related to real neighboring scales as shown in FIG. 13B on the right side. There is no space 94 between the detected scales.

The further adjacency filter applied is scales properties consistency in FIG. 13C. A grid of scales on reptile skin follows a pattern of rather smooth variation of scales sizes and orientations. To check for this consistency, several options can be applied in the method. One possibility is to analyse scales grid 97 where the value of properties 95 as for example major axis is represented as a 3D surface. Major axis size as z value producing sparse but smooth surface of values means good neighbors. There is implicitly a condition of overlapping scales in the sizes uniformity, but main point is smoothness=neighboring. A gradient of properties 96 would be evaluated to judge the smoothness of scales properties. Another possibility is to build a group of adjacent ellipses 98 as also shown in FIG. 13D and evaluate group geometric properties of those groups locally to validate consistency. Geometric properties that would validate a group can be divided into three sections. One is uniformity of scale properties like same orientation, size and center position. Second, it is joint property of their borders. Outlines of adjacent cells should share proximity of common border/outline, do not contain too much space or other scales in between (consistent with scales size). Third, exact shape of the outlines could exhibit some similarities e.g. less convex shapes on all scales or specific rounded corners, all as shown in FIG. 13D. One embodiment of such step would be to group ellipses by "cross" pattern or 3×3 pattern and evaluate the smoothness of ellipse properties in various direction in each of such groups.

Conditions above would serve the goal of filtering adjacency links between voted ellipses. Links that do not satisfy properties consistency and smoothness would be removed. After such filtering, there will remain links only between potential scales that could form a grid. Final filter at this stage is to select ellipses/scales that while exhibiting consistent properties provide maximum coverage of an area of a skin. The outcome of this step closes the step build grid graph 51.

In some cases all previous steps might still not detect some scales generally because of weak illumination or incident light or else. When the grid is built, it creates a probability surface where scales of certain size and orientation are expected to be. Missing scales would correspond to gaps in that grid where a scale with expected parameter could be attempted with the recompute scales step 52 to be detected again with a set of parameters that would favor its detection. Therefore, if at a position x,y a scale with axes a,b is expected a step scale candidates 50 can be repeated with much more tolerant parameters favoring edges at expected scale outline.

An embodiment of the recompute scales step 52 will be explained in the following with reference to FIG. 21A to 21C and FIG. 22A to FIG. 22C. This, generally, occurs, as mentioned above if weak illumination or incident light is present, because edges of those scales are not visible because of weak ambient illumination, direction of light, flattened edges of some scales, dark color of those scales and space between them. Step Recompute scales 52 attempts to recover missing scales by using information about adjacent scales similarity in general and dissimilarity along borders between skin areas. This information is present in scales properties with respect to newly build grid.

Figure 21A:
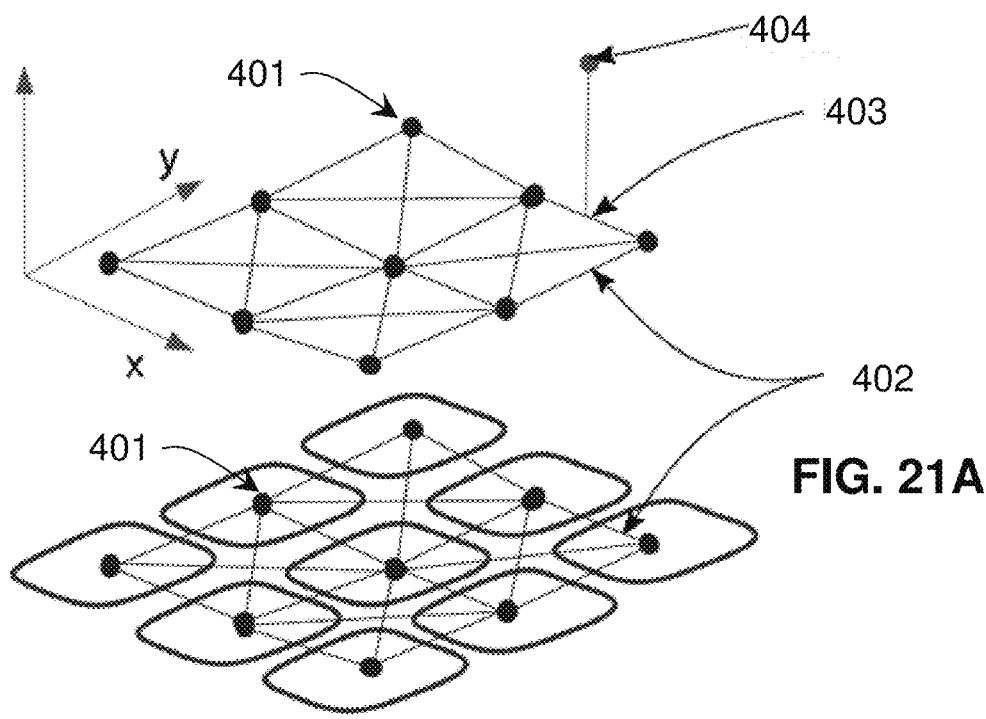
FIG. 21A to 21C shows in FIG. 21A the grid of scales as well as its graphic representation as with nodes and graphic links, in FIG. 21B a surface related to the representative data properties of the scales and in FIG. 21C.

The first part of step 52 is to upgrade the grid built until this stage with information about scales properties. In FIG. 21A the grid of scales are represented as graph with nodes 401 corresponding to scale centers and Graph Links 402 connecting centers of scales that share common border. For each link several feature values will be calculated and stored with x,y coordinates of Link Midpoint 403 and value of features Link Property 404 as z coordinate(s). This will create a sparse value points in 3D space.

Figure 21B:
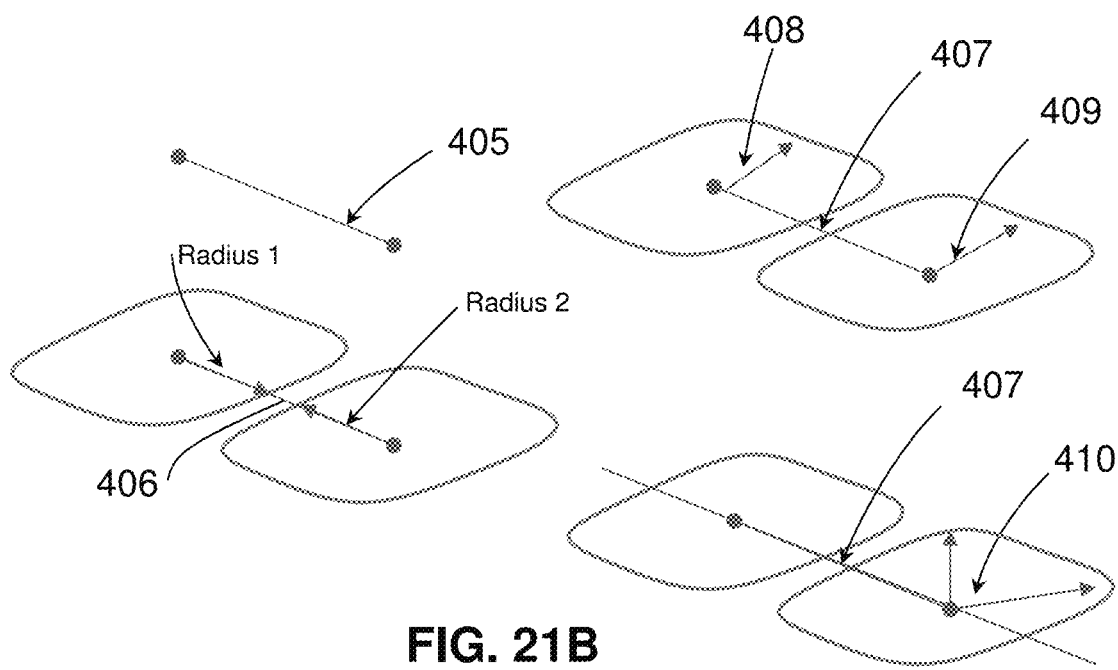

In FIG. 21B three features are reflected. One feature will be Interscale Distance 405 and sum of Radius1 and Radius2. The reference numeral 406 is pointing to the direct connection and includes the distance between the two scales, it is intended that 406 is related to the sum, i.e. minus this distance between the two scales. If scales are adjacent, those two values should be similar. Second feature is Interscale Orientation 407, i.e. the direction of the connection, not its length, and first Main Axis Orientation 408 and second Main Axis Orientation 409 for two scales corresponding to the link. Two main orientations 408 and 409 are measured with respect to the Interscale Orientation 407. Finally, shape of scale that is not reflected by main and secondary axes. Shape is defined with respect to Interscale Orientation 407 and defines how elliptical the scale is if Interscale Orientation 407 would be the ellipse axis, which is called ellipticity 410. One extreme of this measure would be the value 0 and reflect a perfect circle, another extreme would be the value 1 and is related to a perfect square with sharp corners. Once those features are calculated, information about adjacent scales is part of the graph and associated with each link between nodes of the graph (corresponding to scales centers).

Figure 21C:
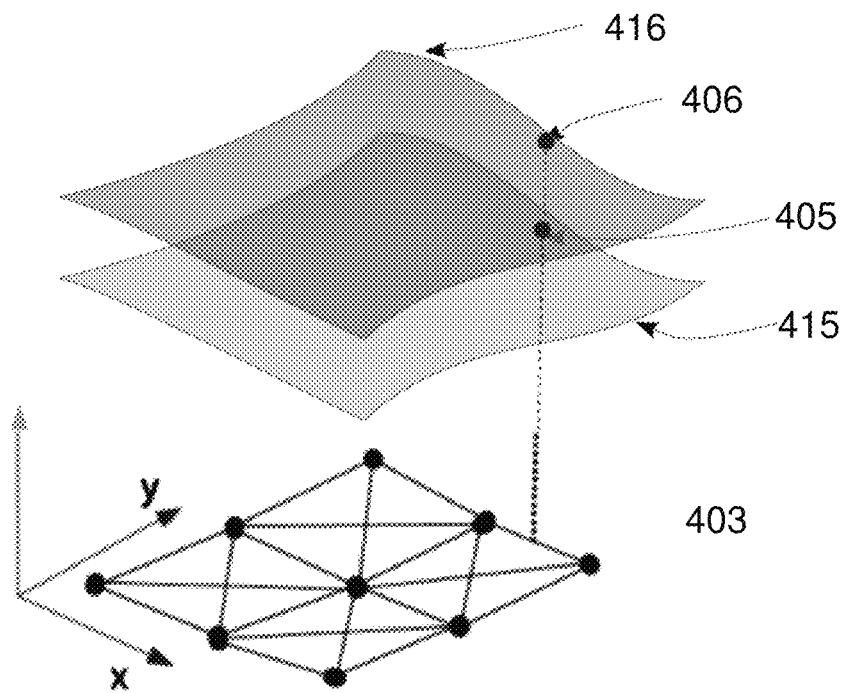

In FIG. 21C every link in a graph stores information about e.g. the first feature with a pair of values: Interscale Distance 411 and Radius 1 plus Radius 2 with reference numeral 406. Sparse points in 3D could be generalized to two surfaces Interscale Distance Surface 415 and Radiuses Sum Surface 416 that approximate sparse values of those two features. Approximation by surfaces could be performed by various fitting methods. Primary to fitting a surface one need to detect areas of scales that have different properties (e.g. belly area have big and square scales while side area have small and round). On FIG. 22A such border is illustrated with two rows of bigger scales from one area 412 and one row of smaller Interscale scales from another area 413. Fitted Interscale Distance Surface 415 in its parametric definition should allow sharper steps along such Borders Between Skin Areas. After fitting such surface represent a probability map to encounter a certain value of given feature at particular place of the skin map. Smoothness of the surface integrating information from a neighborhood of scales represent the evolution of features along x,y directions.

Figure 22A:
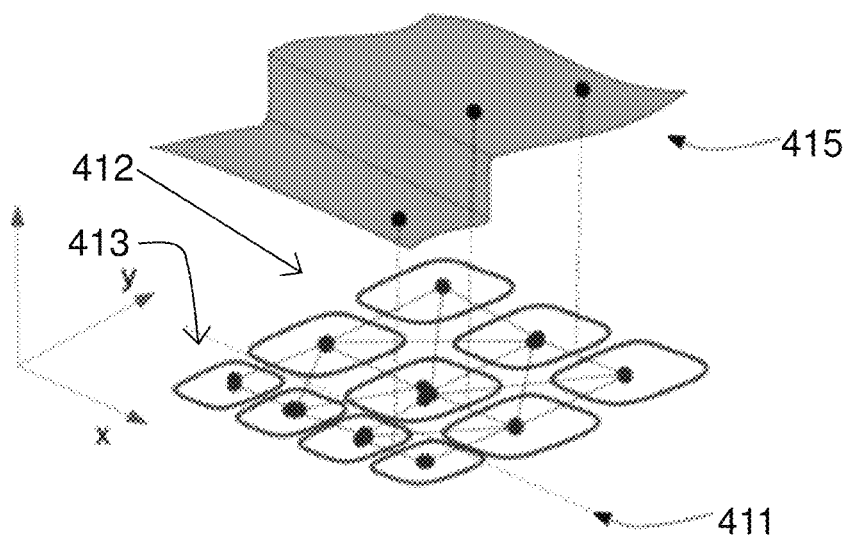
FIG. 22A to 22C shows in FIG. 22A the influence of sizes on the scales, in FIG. 22B a missing scale situation and in FIG. 22C the relevance of spanning the gap lines within missing scale detection.
Figure 22B:
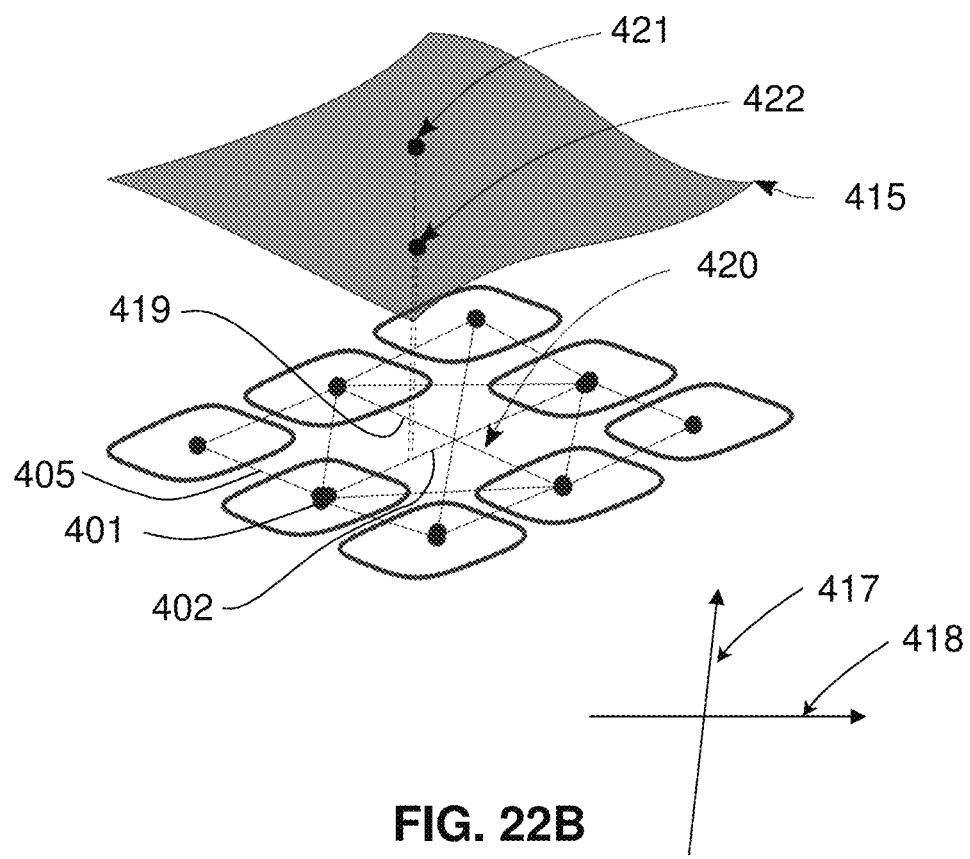

On FIG. 22B a situation where one scale is missing is illustrated. Constructed graph shows links across that Missing Scale Place 420. Values of features in that area would be not in accordance with neighbors and e.g. sum of scale radiuses 406 on both sides of the link 402 would be much smaller than Interscale Distance 405. It is noted that some nodes 401 seem not to be a single circle but an aggregation of circles; this is an unintended artifact of the drawing. To find such gaps values (f.ex. Interscale Distance 405) measured at each link Value Of The Link 421 is compared with Expected Value On Surface 422. If discrepancy is not in accordance with links nearby, then a gap is detected and noted as missing scale place 420. It should be noted that some links are crossing each other and could provide different values in same x.y location. To have consistency the scanning of the graph is performed once in a First Direction 417 (with possibility to follow links having angles less than 70 degrees with this direction. And then a scan is performed a second time in Second Direction 418. Links that have values discrepancies are identified as Links Spanning the Gap 419, which is in the case of FIG. 22B also the graph link having the reference numeral 402.

Figure 22C:
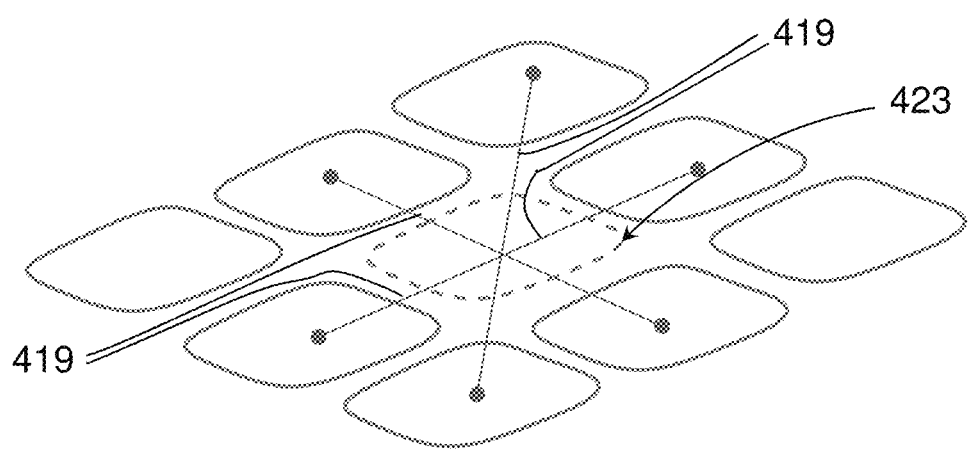

In FIG. 22C three out of four Links Spanning the Gap 419 are shown. Properties stored in those links by comparison with Expected Value on Surface 422 allow o reconstruct a scale shape Expected Scale 423 that would be normally present in the gap so that uniformity of properties follow better the surface. The last phase of step 52 would thus be to follow that Expected Scale outline (here in dashed lines) 423 and analyse the original image beneath it for evidence such as pieces of edges, minor changes of contrast, texture irregularities along that outline that would confirm a presence of scale (which was not detected at original steps with higher degree of certainty required.

Once the grid of scales was built directly or via the recompute scales step 52, precise outline construction can be started with build outlines step 53. The nature of reptile skin scales is such that there is no one evident path where scale outline is present. Wrinkles, flattening, paint, tanning to name few operations of supply chain would alter the way scale is seen. Therefore building one version of scale outline is a compromise between multiple factors. It should be calculated to provide the most similar result across supply chain alterations of the skin and so should pick the most reliable properties of the scale.

Figure 15A:
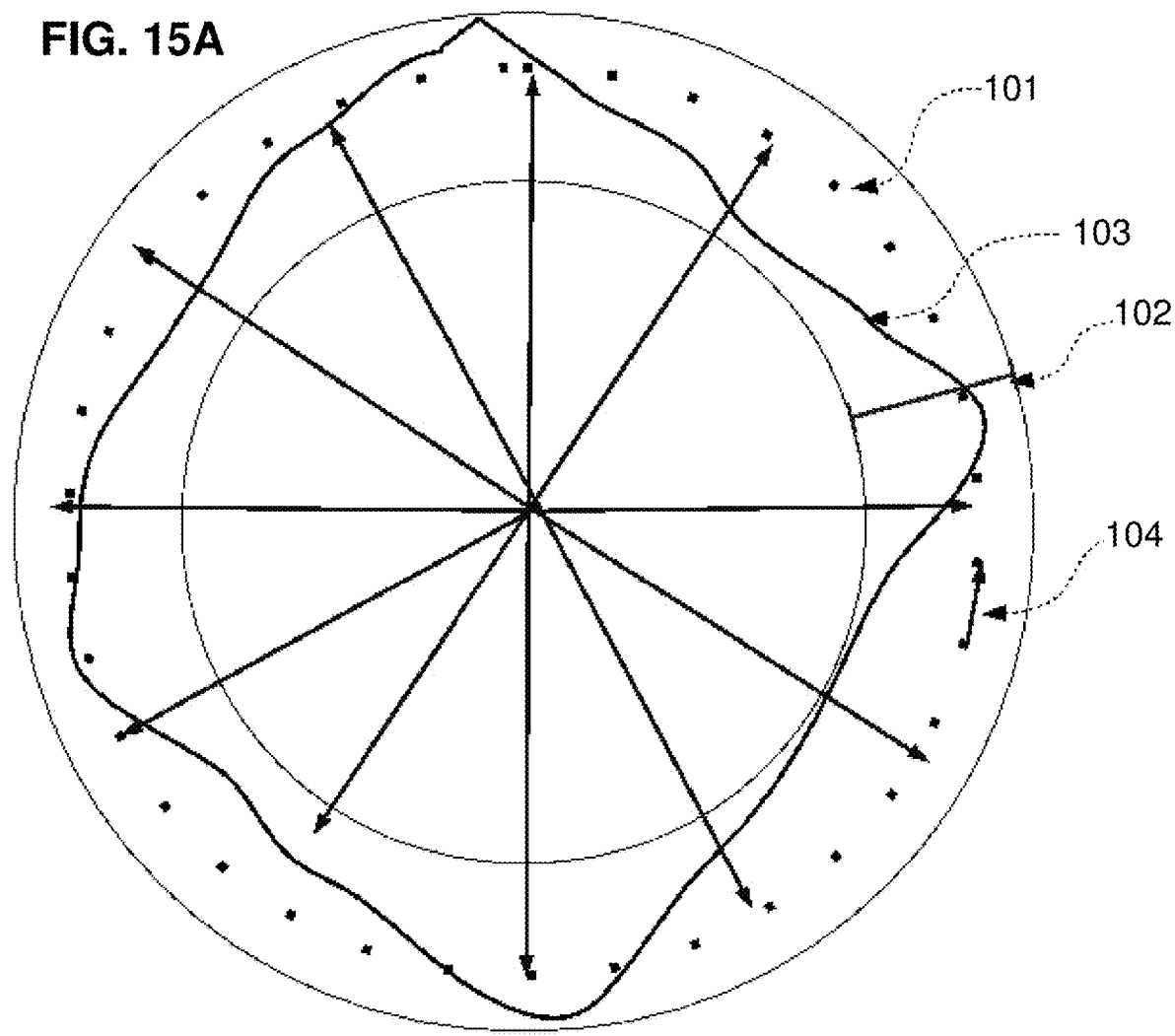
FIGS. 15A & 15B show in 15A) an outline construction step for a scale and in 15B) a detail view.

Outline following context is set on FIG. 15A. Initial scale was detected as ellipse or partial contour composed of elements that voted for ellipse. Therefore, a template 101 can be proposed and built as initial version of outline. Tolerance limits 102 will provide an envelope in which resulting outline 103 will be built. Those tolerance limits 102 are defined by scale size and surrounding grid for interior and by size tolerance and neighbors from exterior.

The outline following itself is an optimization process that can use the template in a form of points or curve defined by an equation or spline-type curves. Optimization can be done by following the template 101 several times applying adjustments or letting each point evolve in parallel. In case of following the template 101 each next point step 104 is adapted in turn. Update of next point position is performed by taking several criteria into account and reaching a compromise where weighted combination of criteria reaches an acceptable minimum.

Figure 15B:
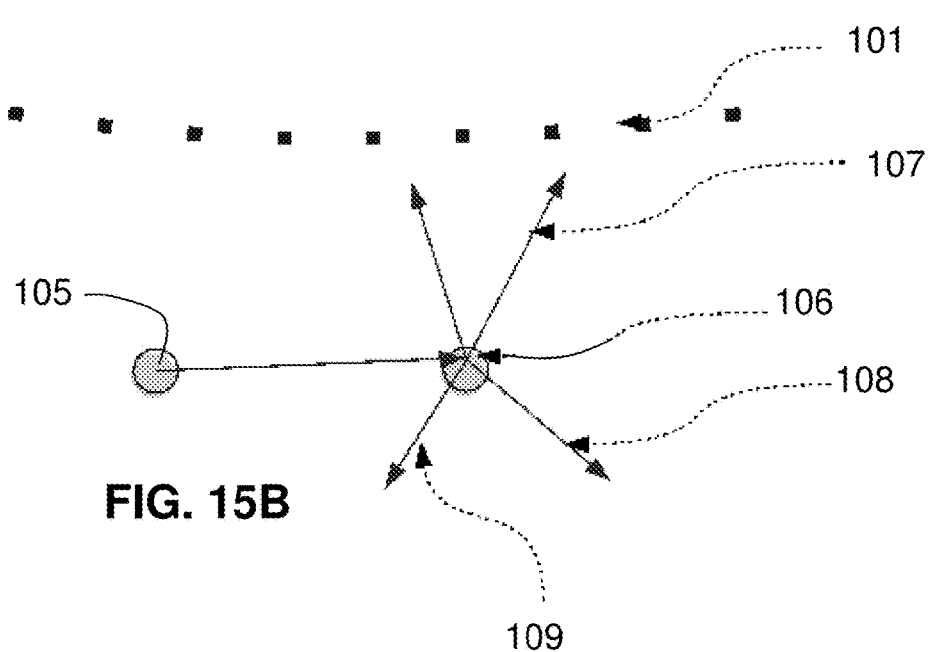

In FIG. 15B a reduced set of criteria is shown. When iteration of optimization moves from previous point 105 to the next point 106, next point 106 is updated. A non-exhaustive list of criteria is: smoothness of the contour, closeness between points, attraction to high gradient of edge of the scale, favoring edge angle (to concentrate on outline and not on wrinkles), closed outline, convexity and consistency with neighbor borders. Those criteria can be combined by weighted combination as second weight: attraction to gradient 108 and first weight: contour smoothness 107 or as logical combination (conditional weight like for example closeness to neighbor border could be favored if certain scale shape is emerging and downgraded if another shape is being present).

Figure 16A:
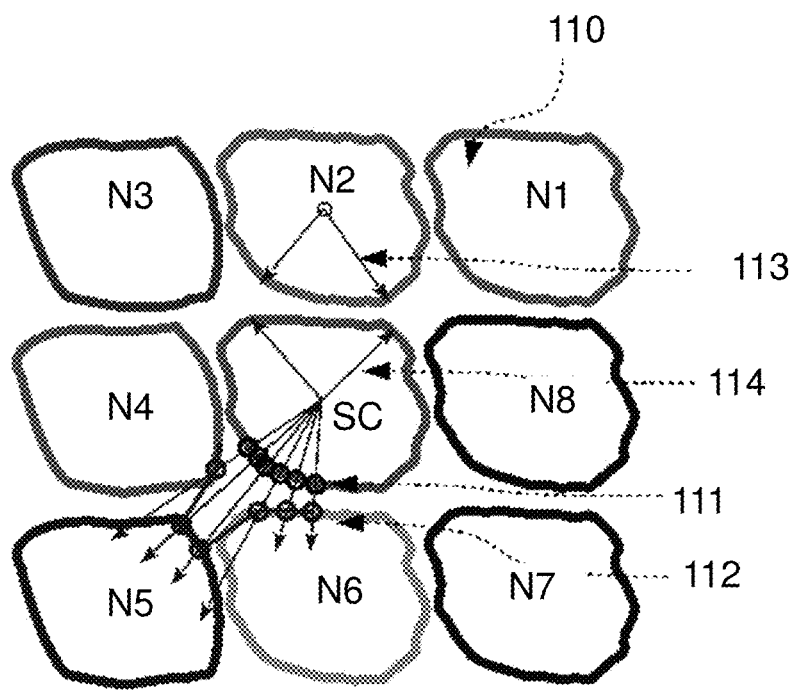
FIGS. 16A & 16B show joint outline correction with neighbors in two different representations.
Figure 16B:
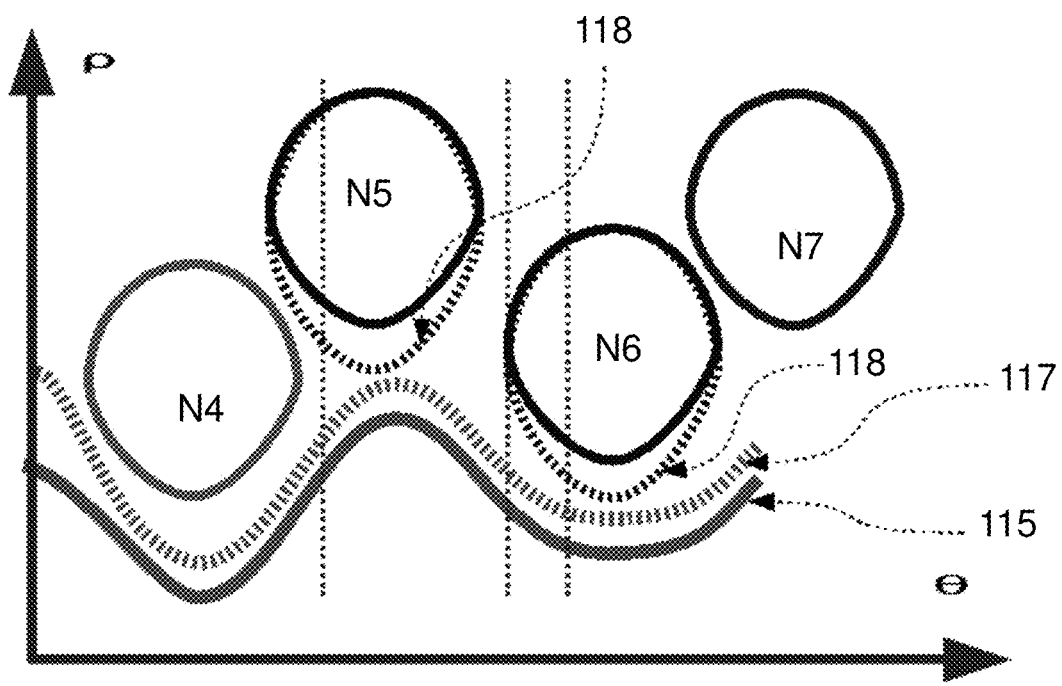

A more detailed illustration of joint outline adjustment is shown in FIGS. 16A and 16B. In FIG. 16A one central scale SC is shown with its neighbors. The neighbor scales 110 are numbered N1, . . . , N8. For the central scale SC one can start with outline central 111 and build closest curve 112 which is characterized by being present on a board of neighboring scales, outside of the outline central and not having any other scales between two curves. Such curve also allows to define sector central 114 and sector neighbor 113 defining a sector in which corresponding central and neighbor scales share part of the border. Then, outlines of central scale and outline of corresponding neighbor scale can be move respectively. Such displacement of outline should respect other criteria mentioned above like smoothness and gradient following.

In FIG. 16B, the same group of outlines is represented in angle-radius (or theta-rho) space where one could. The central outline 115 curve is shown in the bottom and neighbor outline 116 also there. The joint displacement of outlines is shown by central outline moved 117 and neighbor outline moved 118.

Figure 17A:
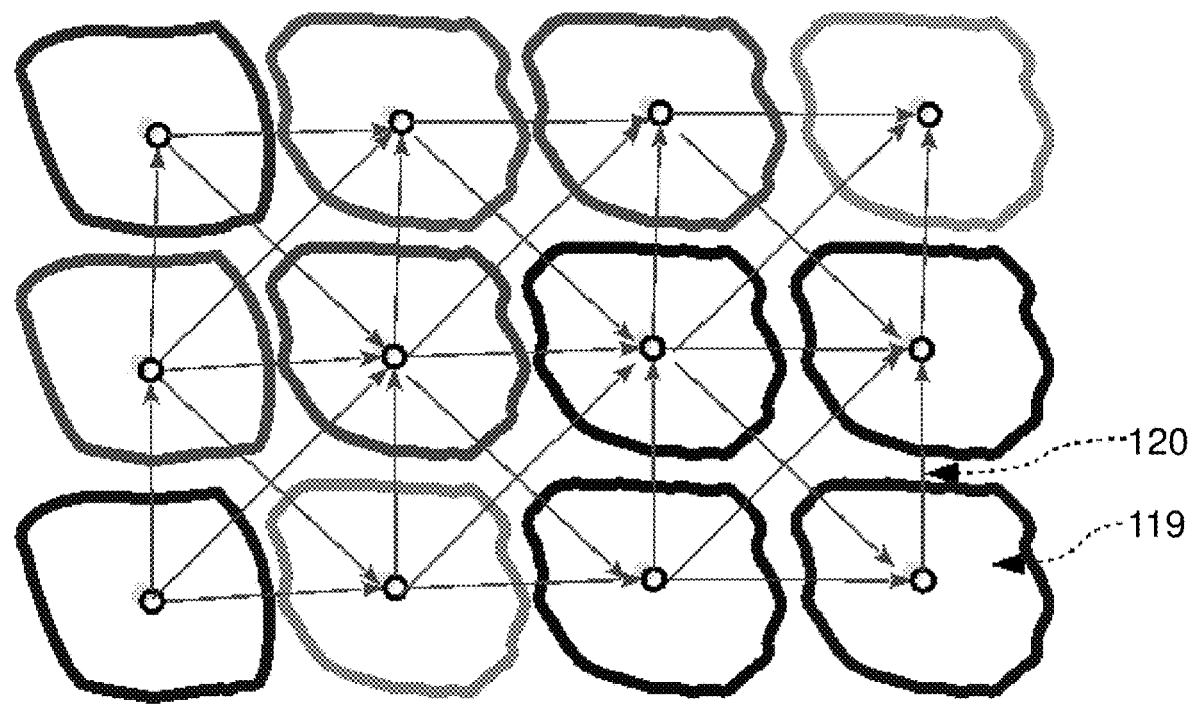
FIGS. 17A & 17B show two skin representations before recognition.
Figure 17B:
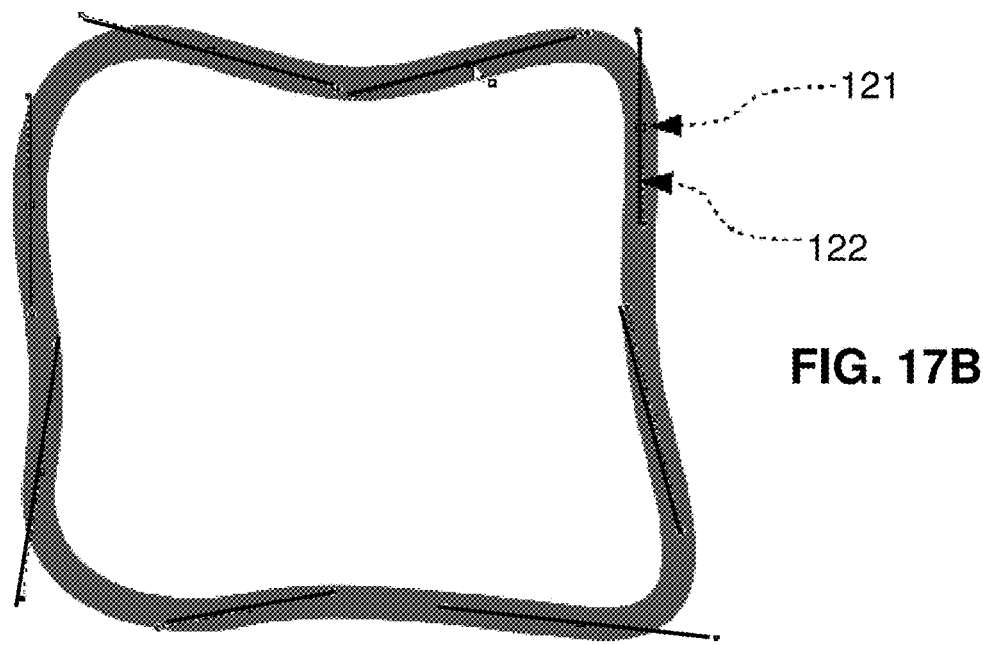

FIG. 17A and FIG. 17B show skin representation before recognition. The phase of build outlines step 53 terminates with completely build skin macroscopic representation as shown in FIG. 17A. Every scale representation 119 is characterized at least by its center and descriptive ellipse, but also by a precise outline that can be characterized by a sequence of points or by a curve. Skin representation is also neighbor link representation 120 that establishes a relationship between two adjacent scales.

Additional advantage of the invention is reflected in FIG. 17B. Outline representation could much more efficient in vector form. Given existing skin base and shape of their outlines, vector representation could, instead of 50-200 points be represented with Vector curve node 121 and Vector curve tangent 122. Approximation of an outline by vector form curve would be then limited to approximately eight nodes and their tangents covering the curve shape with sufficient precision. Thus, using vector form would reduce macroscopic shape representation by a factor of magnitude. FIG. 17B shows two such nodes with vectors for each of the four mainly rectangular scale borders Placement and selection of nodes in vector curve used in this invention would pursue other goals than just compactness. First, it would help standardized scales comparison in recognition. Second, it would streamline indexing step of the recognition. Third, it would help evaluating some quality-related features for skins. Fourth, it would help in display. Fifth, it would help in estimating deformations of the skin, Sixth, it would serve as a reference frame to describe microscopic feature position (see next paragraph). Placement and selection of nodes is, thus, a constrained step to produce a set of vector nodes and tangent satisfying specific properties.

Beside macroscopic features, every skin part bears microscopic features such as wrinkles and microscopic folds of the tissue, texture and color. Most of those features do not exist across whole supply chain. Main interest represent wrinkles that essentially broadly appear after tanning and by their rich diversity would allow to identify small parts of the skin going till size of wrist bracelets. Detection of such features from image would occur during first step of the method or in additional step after scales detection. Every wrinkle or fold of the surface would then be expressed as a curve in coordinate system of two points of the vector representation. Indeed, two vector curve node 121 and their vector curve tangent 122 would be sufficient to geometrically describe precise position of a wrinkle. At the recognition, it is possible that user would not need to look for specific area as all areas would be stored in the database. One would hover over the bracelet until system confirms that wrinkles are acquired well and then recognition would step in. Second part of the phrase refers to the fact that wrinkles appear only after tanning. This makes the method favorable that the recognition process is initially effected, when the hatchling can be scanned and then the data is updated over the lifetime of the animal and especially after his death and handling of the skin updating the database while checking that it is the same animal.

Various applications are foreseen based on reliable skin representation, but the following section concentrates on the recognizing step 54. In brief, it's a step where many skin representations were stored in a database and based on newly presented skin or its part, the computer implemented method is able to say if this skin or part is known or not. No prior knowledge of which skin, part, position, acquisition distance, light is known.

Figure 18A:
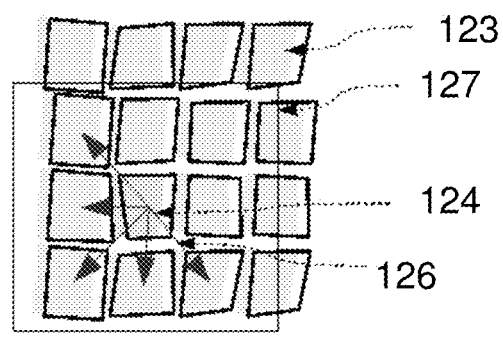
FIG. 18A to 18C show a basic comparison of a patch of reptile skin.
Figure 18B:
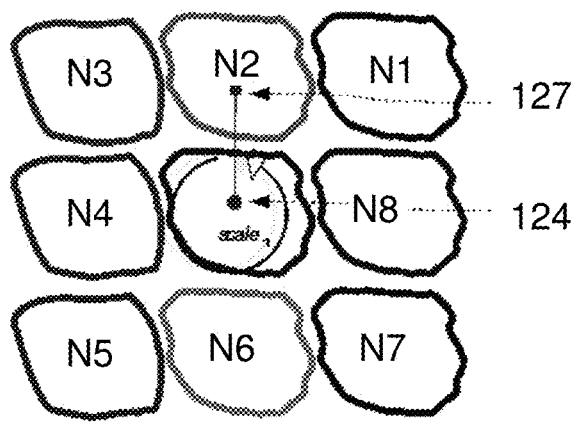
Figure 18C:
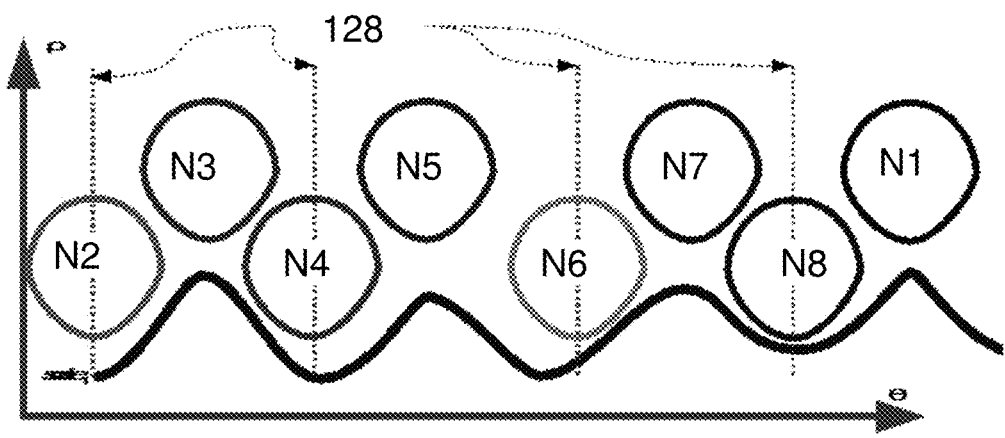

FIG. 18A to 18C show a basic comparison of a patch of reptile skin. In FIG. 18A one can outline the needed terms for recognition. A skin portion 123 is presented to the system to be recognized. This may be any part of a skin as shown in FIG. 5. As there is no any reference information is available, several options exist. First, recognition can start from any starting scale 124 and propagate in all directions of propagation 125. This approach requires that database have features allowing recognition from any point of a skin stored in a database (discussed below). Second, skin representation can be built and some properties (like belly or spinal directions) detected and then recognition would start from a limited number of scales near a certain area. This approach, however, requires that some specific features are visible which is not always the case like for example in case of watch bracelet. Third, point of recognition can start from a place that is indicated by a user.

As a consequence, it is worth to speak about recognized patch area of unique recognition 126. This means a surface of that allows to uniquely identify a part of a skin. Recognition process identifies a common part between skin presented to the system and part of a skin stored in the database. Macroscopic recognition means that in certain area, the shapes and relative position of scales match up to a tolerance that could be originating from processing applied to a skin during supply chain, but not from two different skins. Performance of a system would be measured by what is the minimum area of a skin that is required for its recognition.

In FIG. 18B one basic step of recognition is presented. As there is no rotational reference available, a basic embodiment would be to rely on information that can be used as rotational reference. One option is to use starting scale 124 and define scales as rotational reference scale 127. Selection of such scales e.g. N2, N4, N6, N8 could be defined as scales that share an important part of their border with starting scale 124 which could be compared to above mentioned starting scale SC.

FIG. 18.c) shows, in a theta-rho representation, the scales patch up to the first surrounding row. Scales patch representation in this form is more suitable for two normalization required. Size of the starting scale 124 is unknown and, therefore, before comparing two patches, a scaling factor could be applied. Various values can be used e.g. the average between major and minor ellipse axis or normalize the scale area to one. As there will be several possible rotational reference scale 127, comparison would need to be done from several comparison start angles 128. However, in the theta-rho space, this would correspond to simple shifting before comparison.

In this particular embodiment, comparison would be required to start from every scale and for each of the rotational reference angles.

Figure 19A:
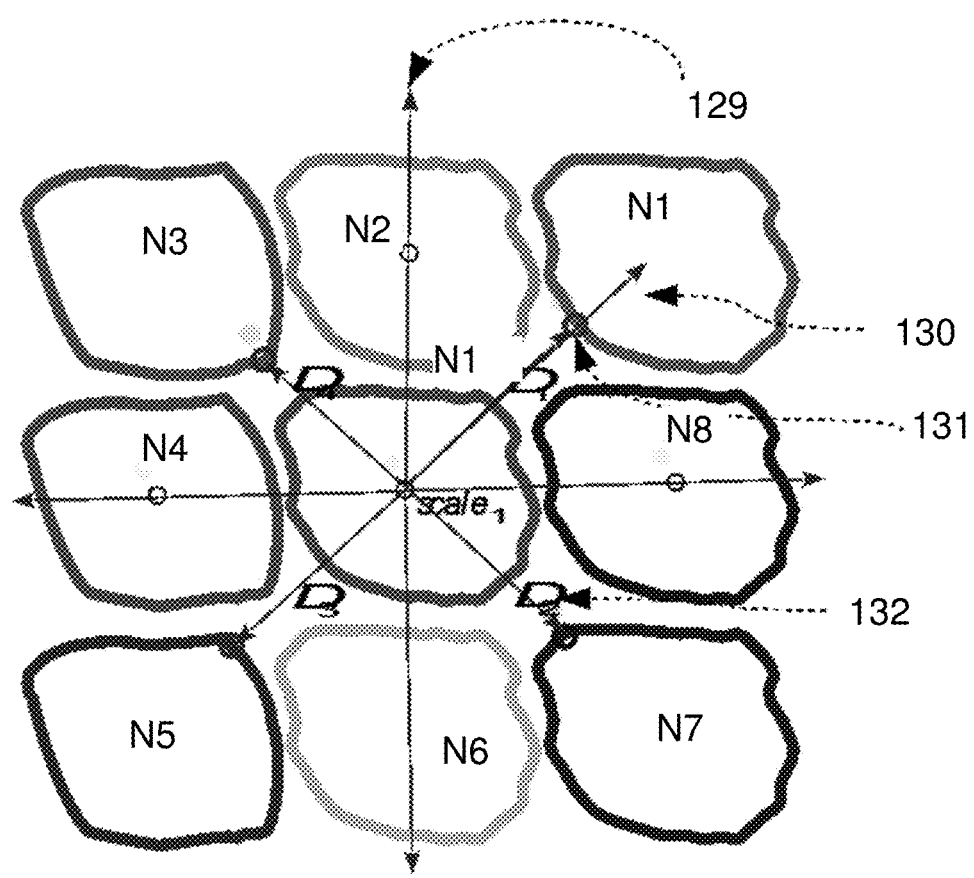
FIGS. 19A & 19B show a rotationally invariant indexing.
Figure 19B:
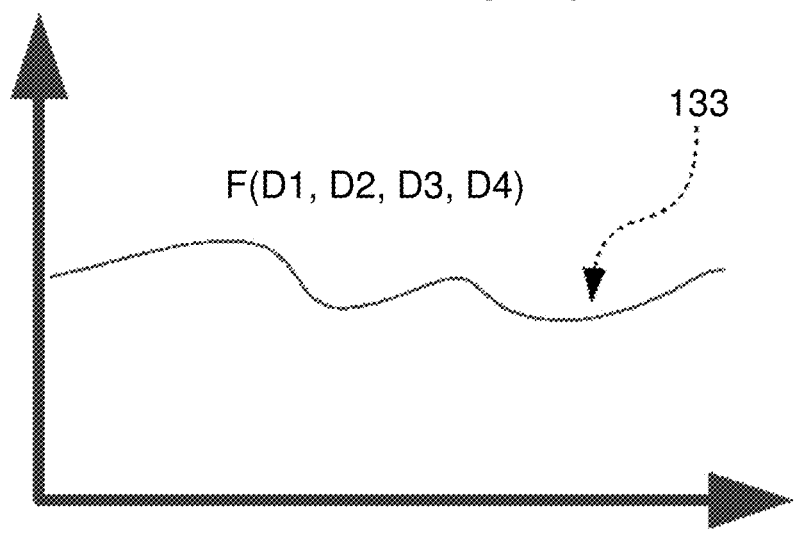

In FIG. 19A one embodiment of rotationally invariant indexing is outlined. Several scales would be used to define several reference directions cardinal references 129. As one would like to avoid relying on one starting orientation, a cross of rays based on those Cardinal references would be rotated as rotating cross 130. For each of its rays position of the first outline exterior to the central outline points on closest outlines 131 would be built. For each of the rays, distances D1, . . . , D4 will be calculated as radiuses 132. In FIG. 19B a function symmetric in those four values would provide a rotationally invariant curve 133 shown in the lower representation of a coordinate system. Actually axes would be a measure independent on rotation and could be not necessarily linked to a dimension. But, in this case, X axis would correspond to an ¼ of the angle range. It could be seen as range spanning between one orientation (between scale center and first neighbor) and orientation between scale center and second neighbor. In case scales are perfect rectangles, it would be 90 degrees, but in general will be different. Y axis would correspond to a function of radius (e.g. ratio between radiuses on rays in four quadrants). Such curve would correspond to one quadrant of scanning losing ¾ of information for the sake of rotational invariance. In case of four quadrants of 90 degrees and radiuses in each quadrant, one searches to achieve independence of quadrant from which comparison is done. So, curve should be the same if the scales are rotated to any of the cardinal orientations. That's four. So, e.g. by taking a ratio between two opposite quadrants 1-3 and 2-4 two curves of one quadrant each are obtained. Such representation would be 2× reduction of information and would be invariant to two out of four possible rotations (not full rotational invariance). In the present case the ratio between radiuses in 1-2-3-4 quadrants are taken to obtain curve of one quadrant length, but that would be invariant to four-fold rotations. Thus full rotational invariance is gained, but ¾ of the radius angle range is lost. Another way of looking at this is to think what should be the shape of geometric figure to be rotationally invariant to four cardinal angles of 0, 90,180,360 degrees. And the answer is that it's sort of a "square" where all four sides could be varying curves, but all four sides are identical. Rotating such figure by four angles would bring it to itself. However, the only unique part in such figure is one side of it which is ¼ of its perimeter and ¾ of it are replication of the ¼. That's justifies ¾.

Such indexing function would be built for all skins in the database and their patches, quantized and used as a multi-dimensional indexing vector to select a subset of curves corresponding to skins that worth to be compared. It should be noted that this curve corresponds to the first closest outline to the central one while second and third wave of outline can be used.

Figure 20:
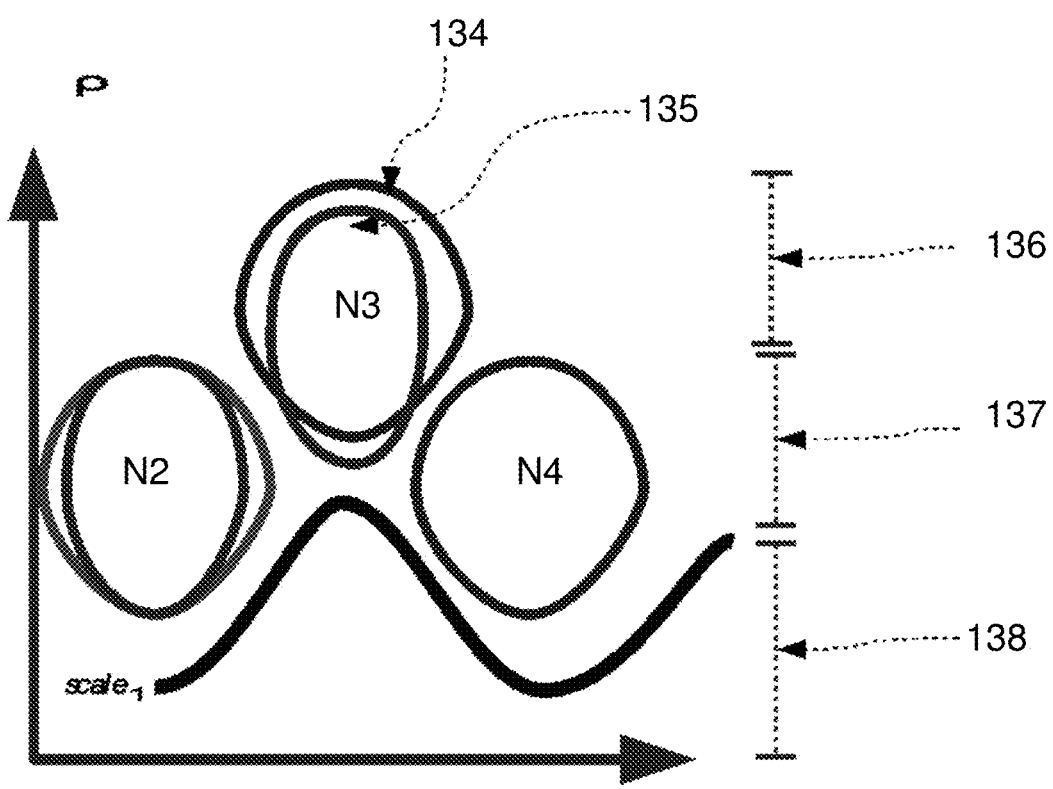
FIG. 20 shows a detailed outline comparison.

FIG. 20 shows a detailed outline comparison. In FIG. 20 gradual comparison of skins selected at indexing step would be explained. Comparison would be performed between skin representations curve 134 being compared with curve in database 135. Comparison would be gradual starting from first radius range 136, if successful, switching to Second radius range 137 and further to third radius range 138.

Speed-up of comparison is achieved by the fact that vector curves can be compared not point-wise, but a difference of two curves can be computed in a closed form from nodes positions. Special forced node positions also favors this approach and comparison by radius ranges.

Further applications of skin representation are possible like quality analysis of the scales shape, selection of best visually appealing segment for bracelets, etc.

The invention claimed is:

1. A computer implemented method of tracking and tracing reptile skins having a skin surface with scales for surface identification, comprising the steps of
    acquiring at least one image of a surface portion to be identified,
        an edge feature detection step detecting edge features of borders of scales in said image by scanning the acquired image along scan lines over an area supposedly comprising a plurality of scales acquiring intensity or color profiles,
    an edge identification step, which analyses the acquired scan line image profiles for determining scale edge candidates of one or more scales,
    a scale construction voting step based on said scale edge candidates determining adequate scale edges being part of a specific scale,
    a scale vote accumulation step determining a data set representative for the identified scale comprising one or more data taken from the group comprising data relating to an ellipse, the major axis and minor axis of an ellipse, and the center position of an ellipse,
    building for each of the identified scales a graph of the repetitive pattern scales positions of the detected scales using the data sets for each of the identified scales,
    introducing a recomputing scales step identifying further scales where the built graph of scales presents gaps, with the steps of:
    representing a grid of scales as graph with nodes corresponding to scale centers and graph links connecting centers of scales that share a common border,
    calculating a feature value for each graph link comprising the link midpoint as 2D-coordinates and a link property as z-coordinate,
    wherein the link property comprises interscale distance and related sum of scale radii,
    wherein missing scales are identified through determining that feature values of the area are not in accordance with neighbor values,
    determining the outline of each of the detected scales and creating a representative data set for each detected scale comprising said outline data,
    determining recognition features data from the plurality of representative data sets of detected scales of the surface comprising scales,
    storing said recognition features data for said surface comprising scales in a database,
    comparing said acquired recognition features data of said animal skin specimen with previously acquired and stored sets of recognition features data of surfaces comprising scales from reptile skins for an identification of the surface portion of the animal skin specimen within said stored recognition features data, and
    in the case of a match of the acquired recognition features data of the animal skin specimen with a stored set of recognition features, updating said database with the comparison result and the updated acquired recognition features.

2. The method according to claim 1, wherein the scale construction voting step is followed by:
    a scale verification step comprising checking the acquired data related to the identified scale against predetermined scale outline properties.

3. The method according to claim 1, wherein the step of building a graph of the repetitive pattern scales positions of detected scales comprises:
    determining from the group of identified scales candidates adjacent non overlapping scales.

4. The method according to claim 1, wherein, when the same surface is scanned at a different time, the acquired recognition features data are stored as updated recognition features data when the match of the surface was recognised.

5. The method according to claim 1, wherein, when the same surface is scanned at a different time, further surface parts of the same surface are scanned for acquiring recognition features data of said further surface parts and these newly acquired recognition features data are stored as updated surface part recognition features data as separate datasets when the match of said same surface was recognised.

6. A computer system comprising
    a processor,
    a computer storage comprising a computer program product adapted to execute the method steps of a computer implemented method of surface identification of tracking and tracing reptile skins having a skin surface with scales for surface portions, comprising the steps of
    acquiring at least one image of a surface portion to be identified,
    an edge feature detection step detecting edge features of borders of scales in said image by scanning the acquired image along scan lines over an area supposedly comprising a plurality of scales acquiring intensity or color profiles,
    an edge identification step, which analyses the acquired scan line image profiles determining scale edge candidates of one or more scales,
    a scale construction voting step based on said scale edge candidates determining adequate scale edges being part of a specific scale,
    a scale vote accumulation step determining a data set representative for the identified scale comprising one or more data taken from the group comprising data relating to an ellipse, the major axis and minor axis of an ellipse, and the center position of an ellipse, building for each of the identified scales a graph of the repetitive pattern scales positions of the detected scales using the data sets for each of the identified scales, introducing a recomputing scales step identifying further scales where the built graph of scales presents gaps, with the steps of:

representing a grid of scales as graph with nodes corresponding to scale centers and graph links connecting centers of scales that share a common border, calculating a feature value for each graph link comprising the link midpoint as 2D-coordinates and a link property as z-coordinate, wherein the link property comprises interscale distance and related sum of scale radii, wherein missing scales are identified through determining that feature values of the area are not in accordance with neighbor values, determining the outline of each of the detected scales and creating a representative data set for each detected scale comprising said outline data, determining recognition features data from the plurality of representative data sets of detected scales of the surface comprising scales, storing said recognition features data for said surface comprising scales in a database, comparing said acquired recognition features data of said animal skin specimen with previously acquired and stored sets of recognition features data of surfaces comprising scales from reptile skins for an identification of the surface portion of the animal skin specimen within said stored recognition features data, and in the case of a match of the acquired recognition features data of the animal skin specimen with a stored set of recognition features, updating said database with the comparison result and the updated acquired recognition features, wherein the computer system further comprises:

a camera adapted to acquire an image of the surface to be identified, and a further computer memory for storing acquired recognition features in a database.

* * * * *